US008058970B2

(12) United States Patent
Mullet et al.

(10) Patent No.: US 8,058,970 B2
(45) Date of Patent: Nov. 15, 2011

(54) SYSTEM AND METHODS FOR AUTOMATICALLY MOVING ACCESS BARRIERS INITIATED BY MOBILE TRANSMITTER DEVICES

(75) Inventors: Willis Jay Mullet, Gulf Breeze, FL (US); Yan Rodriguez, Suwanee, GA (US); Michael Scott Swift, Milton, FL (US)

(73) Assignee: HomeRun Holdings Corporation, Pensacola, FL (US)

( * ) Notice: Subject to any disclaimer, the term of this patent is extended or adjusted under 35 U.S.C. 154(b) by 0 days.

(21) Appl. No.: 12/908,085

(22) Filed: Oct. 20, 2010

(65) Prior Publication Data

US 2011/0032073 A1 Feb. 10, 2011

Related U.S. Application Data

(60) Continuation-in-part of application No. 11/999,536, filed on Dec. 6, 2007, which is a division of application No. 11/211,297, filed on Aug. 24, 2005, now Pat. No. 7,327,107.

(51) Int. Cl.

| | |
|---|---|
| ***B60R 25/00*** | (2006.01) |
| ***G05B 19/00*** | (2006.01) |
| ***G06F 7/00*** | (2006.01) |
| ***G08B 29/00*** | (2006.01) |
| ***H04B 1/00*** | (2006.01) |

(52) U.S. Cl. ..................... 340/5.71; 340/5.26; 340/5.61; 340/686.1; 318/280

(58) Field of Classification Search ................. 340/5.71, 340/5.26, 5.61, 686.1; 318/280, 282, 283; 49/340; 455/420, 418; 192/90

See application file for complete search history.

(56) References Cited

U.S. PATENT DOCUMENTS

| | | | |
|---|---|---|---|
| 4,025,791 | A | 5/1977 | Lennington et al. |
| 4,121,102 | A | 10/1978 | Wilson |
| 4,207,468 | A | 6/1980 | Wilson |
| 4,398,172 | A | 8/1983 | Carroll et al. |
| 4,492,111 | A | 1/1985 | Kirkland |
| 4,665,395 | A | 5/1987 | Van Ness |
| 4,870,419 | A | 9/1989 | Baldwin et al. |
| 4,942,393 | A | 7/1990 | Waraksa et al. |

(Continued)

FOREIGN PATENT DOCUMENTS

| | | |
|---|---|---|
| DE | 29901677 | 8/2000 |

(Continued)

OTHER PUBLICATIONS

"Hands-Free Actuation of Remote Controls," Nerac Document No. (NDN) 085-00002-0080-9, Author unknown (Apr. 23, 2004) [U.S. Appl. No. 11/211,297 (Patent No. 7,327,107) to Mullet, et al., Feb. 5, 2008].

*Primary Examiner* — Nam V Nguyen

(74) *Attorney, Agent, or Firm* — Baker & Hostetler LLP

(57) ABSTRACT

A discrete add-on control system for a barrier operating system is provided. The control system includes a mobile transmitter, a barrier state transmitter a controller and an indicator. The mobile transmitter automatically and periodically generates a mobile signal. The barrier state transmitter generates a barrier state signal. The controller is connected to the barrier operating system, receives the mobile signal and the barrier state signal, and commands the barrier operating system to move a barrier based upon the mobile signal and the barrier state signal. The indicator indicates a condition of the barrier.

19 Claims, 25 Drawing Sheets

U.S. PATENT DOCUMENTS

| | | | | |
|---|---|---|---|---|
| 4,967,581 | A | | 11/1990 | Ecrepont |
| 5,126,686 | A | | 6/1992 | Tam |
| 5,132,697 | A | | 7/1992 | Tan |
| 5,164,732 | A | | 11/1992 | Brockelsby et al. |
| 5,177,900 | A | | 1/1993 | Solowiej |
| 5,192,954 | A | | 3/1993 | Brockelsby et al. |
| 5,196,846 | A | | 3/1993 | Brockelsby et al. |
| 5,235,633 | A | | 8/1993 | Dennison et al. |
| 5,243,652 | A | | 9/1993 | Teare et al. |
| 5,311,186 | A | | 5/1994 | Utsu et al. |
| 5,319,364 | A | | 6/1994 | Waraksa et al. |
| 5,379,033 | A | | 1/1995 | Fujii et al. |
| 5,402,105 | A | * | 3/1995 | Doyle et al. ............. 340/539.22 |
| 5,406,275 | A | | 4/1995 | Hassett et al. |
| 5,412,297 | A | | 5/1995 | Clark et al. |
| 5,412,379 | A | | 5/1995 | Waraksa et al. |
| 5,504,482 | A | | 4/1996 | Schreder |
| 5,515,036 | A | | 5/1996 | Waralsa et al. |
| 5,519,403 | A | | 5/1996 | Bickley et al. |
| 5,559,520 | A | | 9/1996 | Barzegar et al. |
| 5,596,840 | A | | 1/1997 | Teich |
| 5,625,980 | A | | 5/1997 | Teich et al. |
| 5,648,767 | A | | 7/1997 | O'Connor et al. |
| 5,678,182 | A | | 10/1997 | Miller et al. |
| 5,684,828 | A | | 11/1997 | Bolan et al. |
| 5,686,902 | A | | 11/1997 | Reis et al. |
| 5,689,269 | A | | 11/1997 | Norris |
| 5,699,055 | A | | 12/1997 | Dykema et al. |
| 5,831,533 | A | | 11/1998 | Kanno |
| 5,903,226 | A | | 5/1999 | Surman et al. |
| 5,929,769 | A | | 7/1999 | Garnault |
| 5,940,007 | A | | 8/1999 | Brinkmeyer et al. |
| 5,969,637 | A | | 10/1999 | Doppelt et al. |
| 5,973,611 | A | | 10/1999 | Kulha et al. |
| 5,990,828 | A | | 11/1999 | King |
| 6,002,332 | A | | 12/1999 | King |
| 6,011,468 | A | | 1/2000 | Lee |
| 6,028,537 | A | | 2/2000 | Suman et al. |
| 6,172,430 | B1 | | 1/2001 | Schmitz et al. |
| 6,206,282 | B1 | | 3/2001 | Hayes, Sr. et al. |
| 6,219,613 | B1 | | 4/2001 | Terrier et al. |
| 6,229,988 | B1 | | 5/2001 | Stapefeld et al. |
| 6,271,765 | B1 | | 8/2001 | King et al. |
| 6,285,931 | B1 | | 9/2001 | Hattori et al. |
| 6,294,981 | B1 | | 9/2001 | Herrmannsdorfer et al. |
| 6,310,548 | B1 | * | 10/2001 | Stephens et al. .............. 340/540 |
| 6,370,475 | B1 | | 4/2002 | Breed et al. |
| 6,388,559 | B1 | | 5/2002 | Cohen |
| 6,400,956 | B1 | | 6/2002 | Richton |
| 6,411,889 | B1 | | 6/2002 | Mizunuma et al. |
| 6,415,439 | B1 | | 7/2002 | Randell et al. |
| 6,429,768 | B1 | | 8/2002 | Flick |
| 6,448,894 | B1 | | 9/2002 | Desai |
| 6,476,732 | B1 | | 11/2002 | Stephan |
| 6,512,466 | B2 | | 1/2003 | Flick |
| 6,535,143 | B1 | | 3/2003 | Miyamoto et al. |
| 6,542,076 | B1 | | 4/2003 | Joao |
| 6,559,775 | B1 | | 5/2003 | King |
| 6,563,431 | B1 | * | 5/2003 | Miller, Jr. .................. 340/932.2 |
| 6,593,845 | B1 | | 7/2003 | Friedman et al. |
| 6,593,856 | B1 | * | 7/2003 | Madau ....................... 340/12.27 |
| 6,597,291 | B2 | * | 7/2003 | Tsui ........................... 340/686.1 |
| 6,616,034 | B2 | | 9/2003 | Wu et al. |
| 6,624,605 | B1 | * | 9/2003 | Powder et al. ................ 318/445 |
| 6,634,408 | B2 | | 10/2003 | Mays |
| 6,781,524 | B1 | | 8/2004 | Clark et al. |
| 6,803,851 | B1 | | 10/2004 | Kramer et al. |
| 6,867,686 | B1 | | 3/2005 | Emmerling et al. |
| 6,883,579 | B2 | | 4/2005 | Olmsted |
| 6,894,601 | B1 | | 5/2005 | Grunden et al. |
| 6,911,898 | B2 | | 6/2005 | Chung |
| 6,978,126 | B1 | | 12/2005 | Blaker et al. |
| 6,980,117 | B1 | | 12/2005 | Kirkland et al. |
| 7,027,773 | B1 | | 4/2006 | McMillin |
| 7,071,813 | B2 | * | 7/2006 | Fitzgibbon ................... 340/5.71 |
| 7,170,426 | B2 | | 1/2007 | Tsui et al. |
| 7,269,416 | B2 | * | 9/2007 | Guthrie et al. ................ 455/420 |
| 7,327,107 | B2 | * | 2/2008 | Mullet et al. .................. 318/280 |
| 7,418,800 | B1 | * | 9/2008 | Sellman .......................... 49/340 |
| 2001/0040514 | A1 | | 11/2001 | Horber |
| 2003/0018478 | A1 | | 1/2003 | Mays |
| 2003/0029579 | A1 | | 2/2003 | Mays |
| 2003/0043021 | A1 | | 3/2003 | Chung |
| 2003/0112121 | A1 | | 6/2003 | Wilson |
| 2003/0142004 | A1 | | 7/2003 | Gottwald et al. |
| 2004/0012483 | A1 | | 1/2004 | Mays |
| 2004/0070516 | A1 | | 4/2004 | Nielsen |
| 2004/0189511 | A1 | | 9/2004 | Gila et al. |
| 2004/0239482 | A1 | | 12/2004 | Fitzgibbon |
| 2005/0024229 | A1 | | 2/2005 | Chuey |
| 2005/0057340 | A1 | | 3/2005 | Fitzgibbon |
| 2005/0073425 | A1 | | 4/2005 | Snell et al. |
| 2005/0134426 | A1 | | 6/2005 | Mullet et al. |
| 2006/0038656 | A1 | | 2/2006 | Wilson |

FOREIGN PATENT DOCUMENTS

| | | |
|---|---|---|
| DE | 202004004446 | 9/2004 |
| EP | 1026354 | 8/2000 |
| EP | 1176392 | 1/2002 |
| EP | 1184236 | 3/2002 |
| EP | 1298955 | 4/2003 |
| WO | 9963363 | 12/1999 |
| WO | 2004077729 | 9/2004 |
| WO | 2005066442 | 7/2005 |

* cited by examiner

SYSTEM AND METHODS FOR AUTOMATICALLY MOVING ACCESS BARRIERS INITIATED BY MOBILE TRANSMITTER DEVICES

CROSS-REFERENCE TO RELATED APPLICATIONS

This is a continuation-in-part application of co-pending application Ser. No. 11/999,536 filed Dec. 6, 2007, which is a divisional application of application Ser. No. 11/211,297 filed Aug. 24, 2005, now U.S. Pat. No. 7,327,107 issued Feb. 5, 2008, the contents of which in their entireties are herein incorporated by reference.

FIELD OF THE INVENTION

Generally, the present invention relates to an access barrier control system. More particularly, the present invention relates to the use of a mobile transmitter maintained in a carrying device to initiate the opening and closing of an access barrier depending upon the position of the carrying device relative to the access barrier.

BACKGROUND OF THE INVENTION

When constructing a home or a facility, it is well known to provide garage doors which utilize a motor to provide opening and closing movements of the door. Motors may also be coupled with other types of movable barriers such as gates, windows, retractable overhangs and the like. An operator is employed to control the motor and related functions with respect to the door. The operator receives command input signals—for the purpose of opening and closing the door—from a wireless portable remote transmitter, from a wired or wireless wall station, from a keyless entry device or other similar device. It is also known to provide safety devices that are connected to the operator for the purpose of detecting an obstruction so that the operator may then take corrective action with the motor to avoid entrapment of the obstruction.

To assist in moving the garage door or movable barrier between limit positions, it is well known to use a remote radio frequency (RF) or infrared transmitter to actuate the motor and move the door in the desired direction. These remote devices allow for users to open and close garage doors without having to get out of their car. These remote devices may also be provided with additional features such as the ability to control multiple doors, lights associated with the doors, and other security features. As is well documented in the art, the remote devices and operators may be provided with encrypted codes that change after every operation cycle so as to make it virtually impossible to "steal" a code and use it at a later time for illegal purposes. An operation cycle may include opening and closing of the barrier, turning on and off a light that is connected to the operator and so on.

Although remote transmitters and like devices are convenient and work well, the remote transmitters sometimes become lost, misplaced or broken. In particular, the switch mechanism of the remote device typically becomes worn after a period of time and requires replacement. And although it is much easier to actuate the remote transmitter than for one to get out of an automobile and manually open the door or access barrier, it is believed that the transmitter and related systems can be further improved to obtain "hands-free" operation. Although there are some systems that utilize transponders for such a purpose, these systems still require the user to place an access card or similar device in close proximity to a reader. As with remote transmitters, the access cards sometimes become lost and/or misplaced. A further drawback of these access cards is that they do not allow for programmable functions to be utilized for different operator systems and as such do not provide an adequate level of convenience.

Another type of hands-free system utilizes a transponder, carried by an automobile, which communicates with the operator. The operator periodically sends out signals to the transponder carried in the automobile and when no return signal is received, the operator commands the door to close. Unfortunately, the door closing may be initiated with the user out of visual range of the door. This may lead to a safety problem inasmuch as the user believes that the door has closed, but where an obstruction may have caused the door to open and remain open thus allowing unauthorized access.

U.S. Pat. No. 7,289,014, incorporated herein by reference, addresses some of the shortcomings discussed above. However, the disclosed system does not provide specific auto-open and auto-close functionality in association with the vehicle's operational status. And the disclosed system does not provide for user-changeable sensitivity adjustments. Implementing a hands-free system that has universal settings for all home installations is extremely difficult. If one designs for optimum RF range, then the opening range of the barrier is improved, but in contrast, the closing range ends up being too high. If one does not design for optimum RF range then in worst case home installations, the opening RF range might not be sufficient. In other words, if the RF signal is too strong, the barrier opens at a distance relatively far away, but closes only out of sight of the user. Or, if the RF signal is too weak, then the user must wait for the barrier to open before entering the garage. Situations may also arise where a designated sensitivity level causes the operator to toggle between barrier opening and closing cycles before completion of a desired cycle.

U.S. Pat. No. 7,310,043, incorporated herein by reference, also addresses some of the shortcomings identified in the prior art. The '043 patent discloses a specific embodiment wherein the mobile transponder is directly connected to the ignition system and power source of the carrying device. However, such an embodiment requires a specialized installation and does not permit easy transfer of the transponder between carrying devices. And the known hands-free devices all require periodic transmission of a radio frequency signal from the garage door operator. It is believed that this may lead to increased electrical "noise" pollution which adversely affects nearby electrical communication devices.

Therefore, there is a need in the art for a system that automatically moves access barriers depending upon the proximity of a device carrying a remote mobile transmitter, wherein the transmitter automatically emits somewhat periodic signals that are received by the operator which then moves the barrier and ignores subsequent transmitter signals for a predetermined period of time. And there is a need for the remote mobile transmitter to also consider the operational status of the carrying device by use of a sensor that may or may not be directly connected to the carrying device's electrical system. And there is a need for a user-changeable sensitivity adjustment for the mobile transmitter.

In addition, a major safety issue with all motorized barriers, such as garage doors, is the ability of the operator to lift the door when the counterbalance system has lost its power, such as when the counterbalance spring or springs are broken. When this occurs, the operator can raise the garage door to the open position by pulling the disconnect. However, with the disconnect pulled, the door can drop uncontrolled to the ground, potentially causing injury or property damage. Moreover, in most cases, the user would not be aware that the spring or springs are broken. Thus, there is a need for a method to determine whether the spring or springs are broken, and to warn the operator of this unsafe condition, and that service to the counterbalance system is needed.

Another safety issue is the risk of injury or damage to persons or objects in the vicinity of a garage door that automatically operates, sometimes before the vehicle carrying the remote mobile transmitter is in sight of the door. Thus there is a need for an improved automatic operator system that has improved safety for unattended operation.

SUMMARY OF THE INVENTION

One of the aspects of the present invention, which shall become apparent as the detailed description proceeds, is attained by embodiments including a system and methods for automatically moving access barriers initiated by mobile transmitter devices.

A discrete add-on control system for a barrier operating system is provided. The control system includes a mobile transmitter, a barrier state transmitter a controller and an indicator. The mobile transmitter automatically and periodically generates a mobile signal. The barrier state transmitter generates a barrier state signal. The controller is connected to the barrier operating system, receives the mobile signal and the barrier state signal, and commands the barrier operating system to move a barrier based upon the mobile signal and the barrier state signal. The indicator indicates a condition of the barrier.

A method of operating a discrete add-on control system for a barrier operating system is also provided. The method includes: receiving a mobile signal automatically and periodically transmitted from a mobile transmitter; receiving a barrier state signal from a barrier state transmitter; determining whether to move a barrier based on the mobile signal and the barrier state signal, and, if so determined, sending an operating signal to the barrier operating system to move the barrier; determining a condition of the barrier; and indicating the condition of the barrier.

BRIEF DESCRIPTION OF THE DRAWINGS

For a complete understanding of the objects, techniques and structure of the invention, reference should be made to the following detailed description and accompanying drawings, wherein.

DETAILED DESCRIPTION

Figure 1:
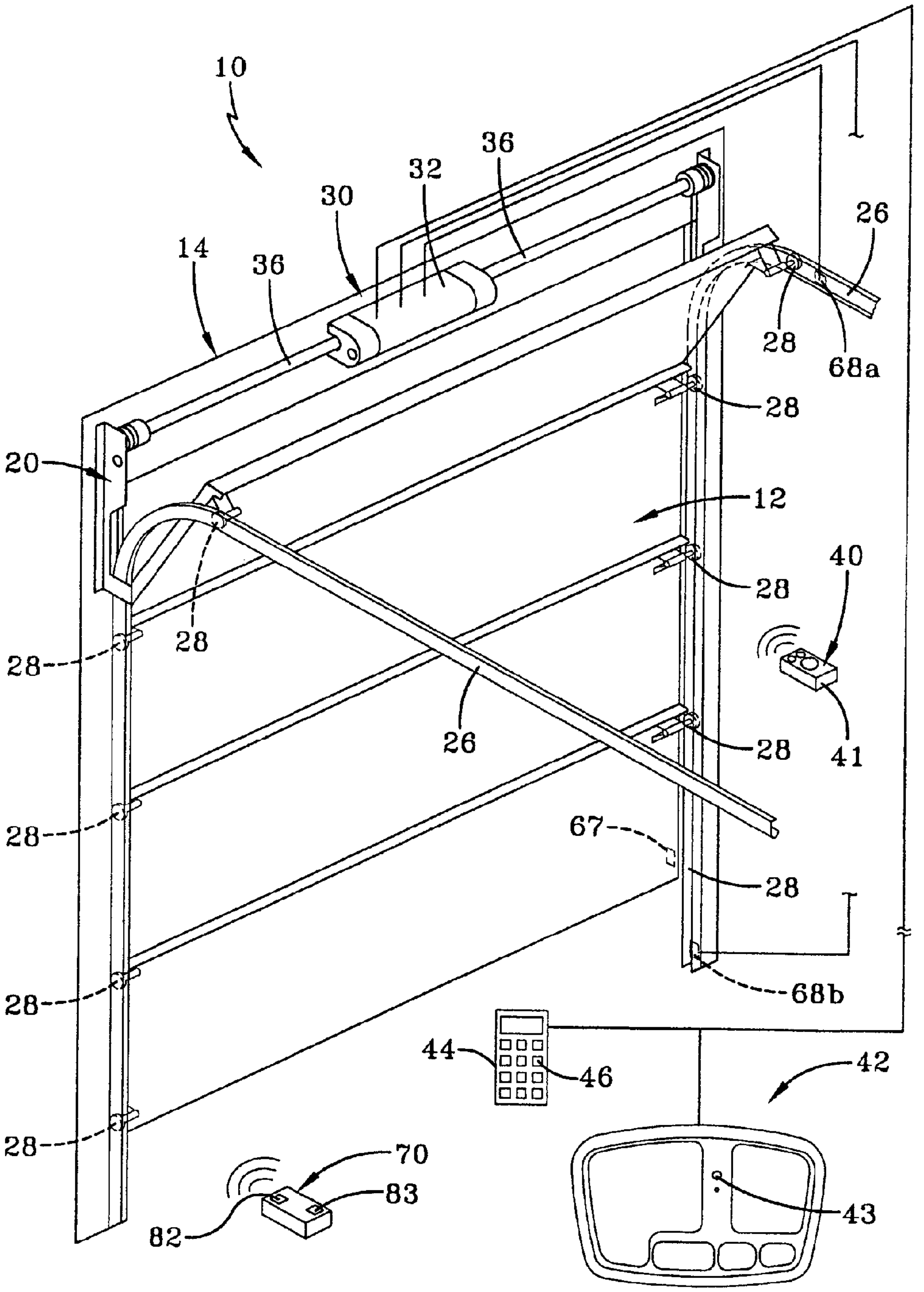
FIG. 1 is a perspective view depicting a sectional garage door and showing an operating mechanism embodying the concepts of the present invention.

A system, such as a garage door operator system which incorporates the concepts of the present invention, is generally designated by the numeral 10 in FIG. 1. Although the present discussion is specifically related to an access barrier such as a garage door, it will be appreciated that the teachings of the present invention are applicable to other types of barriers. The teachings of the invention are equally applicable to other types of movable barriers such as single panel doors, gates, windows, retractable overhangs and any device that at least partially encloses or restricts access to an area. Moreover, the teachings of the present invention are applicable to locks or an automated control of any device based upon an operational status, position, or change in position of a proximity or triggering device. Indeed, it is envisioned that the present teachings could be used as a remote keyless entry for automobiles, houses, buildings and the like. The disclosed system could be used in any scenario where an object (such as a garage door controlled by an operator) changes state or condition (open/close, on/off, etc.) based upon a position (away/docked) or change in position (approaching/leaving) of a second object, such as a mobile transmitter, with respect to the first object.

The discussion of the system 10 is presented in three subject matter areas: the operator; the hands-free mobile transmitter; and operation of the mobile transmitter with the operator. The discussion of the operator presents aspects commonly found in a garage door operator and which enable features provided by the mobile transmitter. The structural aspects of the mobile transmitter include a discussion of an encryption technique utilized thereby; use of an activity and/or an ignition sensor by the transmitter; and the setting of sensitivity levels and the ability of the mobile transmitter to be actuated manually. Finally, the discussion of the operation of the mobile transmitter and the operator provides two different operational scenarios. The first scenario relates to the use of dual transmitter signals; and the second scenario is where the mobile transmitter uses signal strengths.

I. Operator

The system 10 may be employed in conjunction with a conventional sectional garage door generally indicated by the numeral 12. The opening in which the door is positioned for opening and closing movements relative thereto is surrounded by a frame generally indicated by the numeral 14. A track 26 extends from each side of the door frame and receives a roller 28 which extends from the top edge of each door section. A counterbalancing system generally indicated by the numeral 30 may be employed to balance the weight of the garage door 12 when moving between open and close positions or conditions. One example of a counterbalancing system is disclosed in U.S. Pat. No. 5,419,010, which is incorporated herein by reference.

Figure 2:
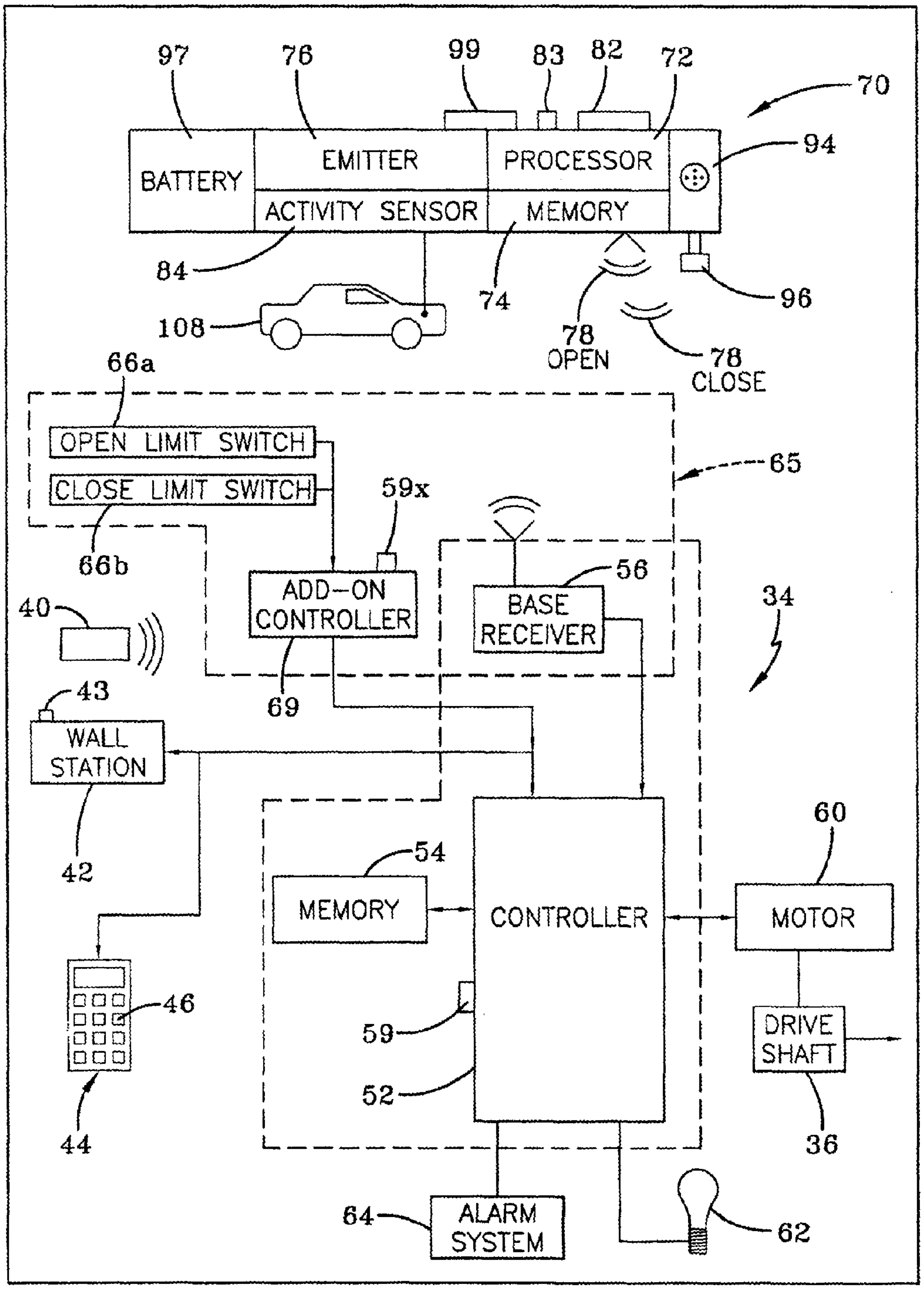
FIG. 2 is a block diagram of an operator system with a hands free mobile remote transmitter according to the present invention.

An operator housing 32, which is affixed to the frame 14, carries a base operator 34 seen in FIG. 2. Extending through the operator housing 32 toward a bracket 20 is a drive shaft 36 which is coupled to the door by cables or other commonly known linkage mechanisms. Although a header-mounted operator is disclosed, the control features to be discussed are equally applicable to other types of operators used with movable barriers. For example, the control routines can be easily incorporated into trolley type, screwdrive and jackshaft operators used to move garage doors or other types of access barriers. In any event, the drive shaft 36 transmits the necessary mechanical power to transfer the garage door 12 between closed and open positions. In the operator housing 32, the drive shaft 36 is coupled to a drive gear wherein the drive gear is coupled to a motor in a manner well known in the art. The control features disclosed are also applicable to any type of actuation system which changes states or condition (open/close, on/off, etc.) based upon a position of an actuation device (docked/away, approaching/leaving, etc.) with respect to the actuation system.

Briefly, the base operator 34 may be controlled by a wireless remote transmitter 40, which has a housing 41, or a wall station control 42 that is wired directly to the system 10 or which may communicate via radio frequency or infrared signals. The remote transmitter 40 requires actuation of a button to initiate movement of the barrier between positions. The wall station control 42 is likely to have additional operational features not present in the remote transmitter 40. The wall station control 42 is carried by a housing which has a plurality of buttons thereon. Each of the buttons, upon actuation, provide a particular command to the controller to initiate activity such as the opening/closing of the barrier, turning lights on and off and the like. A program button 43, which is likely recessed and preferably actuated only with a special tool, allows for programming of the base operator 34 for association with remote transmitters and more importantly with a hands-free mobile transmitter as will become apparent as the description proceeds. The system 10 may also be controlled by a keyless alphanumeric device 44. The device 44 includes a plurality of keys 46 with alphanumeric indicia thereon and may have a display. Actuating the keys 46 in a predetermined sequence allows for actuation of the system 30. At the least, the devices 40, 42 and 44 are able to initiate opening and closing movements of the door coupled to the system 30. The base operator 34 monitors operation of the motor and various other connected elements. Indeed, the operator may even know the state, condition or position of the door, and the previous operational movement of the door. A power source is used to energize the components of the system 10 in a manner well known in the art.

The base operator 34 includes a controller 52 which incorporates the necessary software, hardware and memory storage devices for controlling the operation of the overall system and for implementing the various advantages of the present invention. It will be appreciated that the implementation of the present invention may be accomplished with a discrete processing device that communicates with an existing base operator. This would allow the inventive aspects to be retrofit to existing operator systems. In electrical communication with the controller 52 is a non-volatile memory storage device 54, also referred to as flash memory, for permanently storing information utilized by the controller in conjunction with the operation of the base operator. The memory device 54 may maintain identification codes, state variables, count values, timers, door status and the like to enable operation of the mobile transmitter. Infrared and/or radio frequency signals generated by devices 40, 42, 44 and the mobile transmitter are received by a base receiver 56 which transfers the received information to a decoder contained within the controller. Those skilled in the art will appreciate that the receiver 56 may be replaced with a transceiver which would allow the operator controller to relay or generate command/status signals to other devices associated with the operator system 10. The controller 52 converts the received radio frequency signals or other types of wireless signals into a usable format. It will be appreciated that an appropriate antenna is utilized by the receiver 56 for receiving the desired radio frequency or infrared beacon signals from the various wireless transmitters. The controller 52 is a Model MSP430F1232 supplied by Texas Instruments. Of course equivalent receivers and controllers could be utilized.

The base receiver is directly associated with the base operator 34, or in the alternative, the base receiver could be a stand-alone device. The receiver 56 receives signals in a frequency range centered about 372 MHz generated by the transmitter. The base receiver may also receive signals in a frequency range of 900 to 950 MHZ. And the receiver may be adapted to receive both ranges of frequencies. Indeed, one frequency range may be designated for only receiving door move signals from a transmitter, while the other frequency range receives identification type signals used to determine position or travel direction of a mobile transmitter relative to the base receiver, and also door move signals.

The controller 52 is capable of directly receiving transmission type signals from a direct wire source as evidenced by the direct connection to the wall station control 42. And the keyless device 44, which may also be wireless, is also connected to the controller 52. Any number of remote transmitters 40*a-x* can transmit a signal that is received by the base receiver 56 and further processed by the controller 52 as needed. Likewise, there can be any number of wall station controls 42. If an input signal is received from a remote transmitter 40, the wall station control 42, or a keyless device 44 and found to be acceptable, the controller 52 generates the appropriate electrical input signals for energizing the motor 60 which in turn rotates the drive shaft 36 and opens and/or closes the access barrier or door 12. A learn button 59 may also be associated with the controller 52, wherein actuation of the learn button 59 allows the controller 52 to learn any of the different types of transmitters used in the system 10.

A light 62 is connected to the controller 52 and may be programmed to turn on and off depending upon the conditions of the mobile transmitter and how it is associated with the controller 52. Likewise, an alarm system 64 may be activated and/or deactivated depending upon the position of the mobile transmitter 70 with respect to the base transceiver 56. It will be noted that additional embodiments of the light 62 and/or alarm 64 are not limited to those shown in FIG. 2, as will be described in greater detail below with reference to FIGS. 15-23.

A discrete add-on processing device is designated generally by the numeral 65 and is primarily shown in FIG. 2, although other components of the device 65 are also shown in FIG. 1. The device 65 may be employed to modify already installed base operators 34 that control barrier 12 movement, wherein the existing units may or may not have an existing receiver. In any event, the device 65 includes an open limit switch 66*a* and a close limit switch 66*b*, each of which detects when the barrier or door 12 is in a corresponding position. This may be done in most any manner, and in one embodiment a magnet 67 is secured to a leading or trailing edge, or adjacent side surface of the door 12. In one embodiment, the magnet 67 is attached to a lower portion of the lowermost sectional door panel in a position proximal one of the tracks 26. At least a pair of inductive sensors 68, e.g., inductive sensors 68*a* and 68*b*, are positioned in the track 26 proximal the magnet 67 so as to form the respective limit switches 66*a* and 66*b*. Accordingly, when the magnet 67 is proximal a sensor 68 located in the track 26, an appropriate signal is generated. The signals, when generated, indicate when the door 12 is in an open position or a closed position. Of course, other types of sensor arrangements, such as tilt switches, positional potentiometers and the like, could be used to indicate the positional or operational status of the door 12.

An add-on controller 69 is included in the device 65 and includes the necessary hardware, software and memory needed to implement this variation of the invention. The memory maintained by the controller may include buffers for storing a number of received signals. If needed, the base receiver 56 may be incorporated into the device 65 and operate as described above, except that the signals received are sent to the add-on controller 69. The add-on controller 69 may provide a learn button 59*x* that allows transmitters to be associated therewith in a manner similar to that used by the controller 52.

The add-on controller 69 receives input signals from at least the limit switches 66. The add-on controller 69 may also receive input from the receiver 56 if an appropriate receiver is not already provided with the existing base operator 34. In any event, based upon input received, the add-on controller generates signals received by the controller 52 to initiate opening and closing movements in manners that will be described.

II. Mobile Transmitter

A mobile transmitter 70, which may also be referred to as a hands-free transmitter or a proximity device, is included in the system 10 and effectively operates in much the same manner as the other wireless transmitters except direct manual input from the user is not required, although manual input could be provided. As will be discussed in detail, the transmitter 70 (the actuation device) initiates door movement or a change in condition of an actuation system depending upon its proximity to the controller, the transmitter's direction of travel with respect to the controller and/or the operational status of the device that is carrying the transmitter. The transmitter 70 includes a processor 72 connected to a non-volatile memory storage device 74. As will be discussed in further detail, the memory may maintain system mobile state variables, count values, timer values, signal counts and the like which are utilized to enable operation of the overall system.

The mobile transmitter 70 includes an emitter 76 that is capable of generating a mobile signal 78 on a periodic or a staggered basis. The generation of the mobile signals 78 and the information or format of the emitted signal may be changed depending upon a detected operational status of the carrying device. Indeed, the mobile signal 78 may be multiple signals, each of which initiates different processing by the controller 52. The processor 72 includes the necessary hardware, software and memory for generating signals to carry out the invention. The processor 72 and the memory 74 facilitate generation of the appropriate information to include in the mobile signal 78 inasmuch as one remote mobile transmitter may be associated with several operators or in the event several remote mobile transmitters are associated with a single operator. In other words, the base controller, e.g., the base operator 34 including the controller 52 or, alternatively, the discrete add-on processing device 65 including the add-on controller 69, is able to distinguish the mobile signals of different transmitters and act upon them accordingly. The system will most likely be configured so that any door move commands generated by the mobile transmitter can be overridden by any commands received from the wall station transmitter.

The mobile transmitter 70 includes a learn/door move button 82 and a sensitivity/cancel button 83 which allows for override commands and/or programming of the mobile transmitter with respect to the controller 52. Generally, the mobile transmitter 70 allows for "hands-free" operation of the access barrier. In other words, the mobile transmitter 70 may simply be placed in a glove compartment or console of an automobile or other carrying device and communicate with the controller 52 for the purpose of opening and closing the access barrier depending upon the position of the mobile transmitter 70 with respect to the base receiver 56. As such, after the mobile transmitter 70 and the base operator 34 are learned to one another, the user is no longer required to press a door move button or otherwise locate the mobile or remote transmitter before having the garage door 12 open and close as the carrying device approaches or leaves the garage. If needed, manual actuation of the button 82, after programming, may be used to override normal operation of the proximity device so as to allow for opening and closing of the barrier or door 12 and also to perform other use and/or programming functions associated with the base operator system 34. Actuation of the button 83, after programming, provides for temporary disablement of the hands-free features.

The transmitter 70 may utilize an activity-type sensor 84 which detects some type of observable phenomenon such as vibration of the carrying device when energized or detection of electric emissions generated by the vehicle's spark plugs. In the alternative, the mobile transmitter 70 may be connected directly to an engine sensor, such as an accessory switch, of the automobile. The engine sensor, as with the other activity-type sensors, determines the operational status of the carrying device which causes the mobile transmitter to generate mobile signals which, in turn, initiate barrier movement.

Additional features that may be included with the proximity mobile transmitter 70 are an audio source 94 and a light source 96. It is envisioned that the audio source 94 and/or the light source 96 may be employed to provide verbal instructions/confirmation or light indications as to certain situations that need the immediate attention of the person utilizing the mobile transmitter 70. The audio and light sources 94 and 96 may also provide confirmation or rejection of the attempted programming steps to be discussed later. All of the components contained with the mobile transmitter 70 may be powered by a battery used by the carrying device or at least one battery 97 which ideally has a minimum two year battery life. If desired, the battery 97 may be of a rechargeable type that is connectable to a power outlet provided by the carrying device. In this case, use of a long-life or rechargeable battery eliminates the need for the activity sensor 84 or direct connection to the accessory switch.

In normal operation, the mobile transmitter 70 will always be on. And the transmitter 70 may be disabled by actuating both buttons for a predetermined period of time. In the alternative, a slide switch 99, which is ideally recessed in the transmitter housing, can be used to quickly enable or disable the transmitter 70. The switch 99 is connected to the processor 72, and upon movement of the switch 99 to a disable position, a cancel command is automatically generated prior to powering down. This is done so that the base controller will not assume that the power down is some other type of signal such as loss of a close signal.

Figure 3:
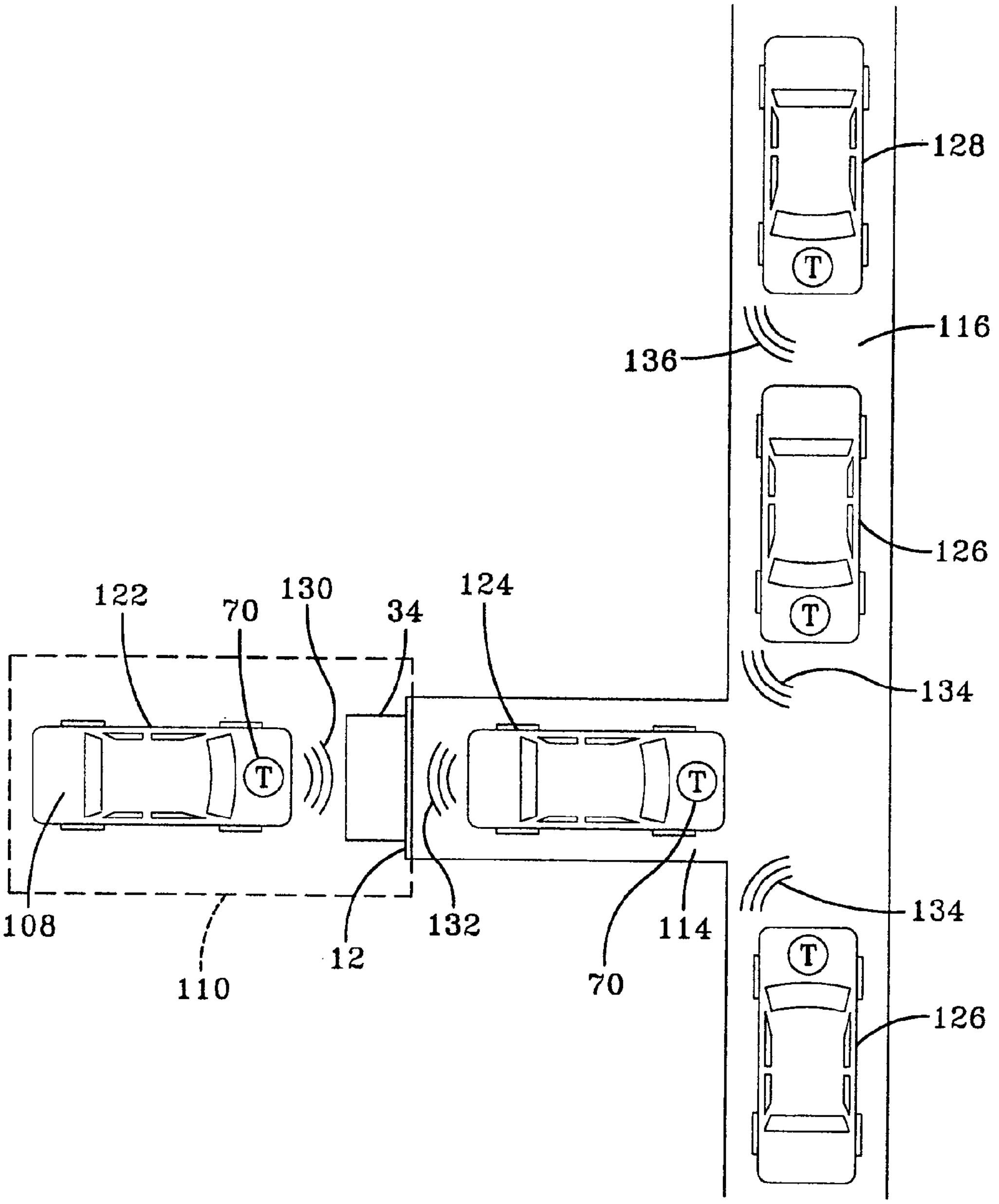
FIG. 3 is a schematic diagram of various positions of an exemplary carrying device with respect to an access barrier that utilizes the operator system according to the present invention.

Referring now to FIG. 3, a schematic diagram showing the relationship between a carrying device 108 that carries the mobile transmitter in its various positions and the base operator system 34 is shown. Typically, the carrying device is an automobile maintained in a garage or other enclosure generally indicated by the numeral 110. The enclosure 110 is separated from its outer environs by the access barrier 12 which is controlled by the base operator system 34 in the manner previously described. The enclosure 110 is accessible by a driveway 114 which is contiguous with a street 116 or other type of access.

The carrying device 108 is positionable in the enclosure 110 or anywhere along the length of the driveway 114 and the street 116. The carrying device 108 may be in either a “docked” state inside the enclosure 110 or in an “away” state anywhere outside the enclosure 110. In some instances, the “away” state may further be defined as a condition when the signals generated by the mobile transmitter 70 are no longer receivable by the base operator 34. As the description proceeds, other operational or transitional states of the transmitter 70 may be discussed. As will become apparent, the transmitter 70 initiates one-way communications with the base controller.

The transmitter 70 may generate signals at different power levels which are detected by the controller, or the transmitter 70 may generate a single power level signal and the controller determines and compares signal strength values for successive mobile signals. In any event, to assist in understanding the states and the power thresholds, specific reference to positions of the carrying device with respect to the enclosure are provided. In particular, it is envisioned that a docked state 122 is for when the automobile or other carrying device 108 is positioned within, or in some instances just outside, the enclosure 110. An action position 124 designates when the carrying device 108 is immediately adjacent the barrier 12, but outside the enclosure 110 and wherein action or movement of the barrier 12 is likely desired. An energization position 126, which is somewhat removed from the action position 124, designates when an early communication link between the transponder 76 and the receiver 56 needs to be established in preparation for moving the barrier 12 from an open to a closed position or from a closed position to an open position. Further from the energization position(s) 126 is an away position 128 for those positions where energization or any type of activation signal generated by the emitter and received by the operator system is not recognized until the energization position(s) 126 is obtained. Indeed, entry into the away position 128 may be recognized by the base controller and result in initiation of barrier movement.

A. Encryption

It will be appreciated that the mobile signals generated by the mobile transmitter 70 may be encrypted. An exemplary algorithm should be fairly simple and small so as not to use all the resources of the processor. Different size bit keys could be used depending upon the desired level of security. The serial number of the transmitting unit will be encrypted using an open source algorithm. Each transmitter is provided with a unique serial number by the manufacturer or the installer. Each base controller is formatted to accept and learn a predesignated range of serial numbers and has software to decrypt a data transmission which includes the encrypted serial number. Added security may be provided by adding a counter or other changing data that changes on every transmission by a predetermined pattern. The changing counter may be a 16-bit number that changes on every transmission according to a predetermined pattern (simple incrementing or it could be a more complex pattern). The base will know how the counter changes and it will receive this message and it will require receipt of a second message with a new counter value that changed according to the predetermined pattern. This prevents any hostile device that emulates the transmitted message and reproduces the exact same message. The base will know that the message is not from a safe source if the counter does not change accordingly.

The base receiver receives the first transmission but will then expect a second transmission with an expected change in the counter data. It will accept the command only if the counter data changes to the expected value. If the data the receiver receives does not have a changing counter, then the receiver could discard the command and assume it is from a hostile source. The key for the encryption routine will be split into two parts. Part of the key will be a static number known to both the mobile and the base, and part of the key will be derived from the counter value. This will help prevent any hostile device that receives the message from having access to sensitive data such as the serial number. The transmitter will transmit the sensitive data encrypted and the counter in the open in the following manner:

| Transmitted Data | | | |
|---|---|---|---|
| Header | Counter | Encrypted Serial Number | Other non-encrypted data |

The receiver will use the same static key to decrypt the sensitive data. It will check the counter to make sure it is at the expected value. If both the key decrypts the data properly and the counter validates correctly, only then will the receiver accept the command or signal transmitted. Use of such an encryption algorithm facilitates use of the mobile transmitter with the operator system.

B. Activity/Ignition Sensors

In FIGS. 4-7 various types of sensors utilized in conjunction with the mobile transmitter device and their operation are shown. As will be discussed, the mobile transmitter utilizes an activity sensor to determine when the carrying device is active. In particular, the vibration sensor or electrical noise sensor detects some phenomenon generated by the carrying device to indicate that it is in an operative condition. The ignition sensor—described in regard to FIG. 7—is directly connected to the electrical operating system of the carrying device and also provides an indication as to its operating state. As will become apparent, the activity sensor enables auto-open and/or auto-close operational features.

Figure 4:
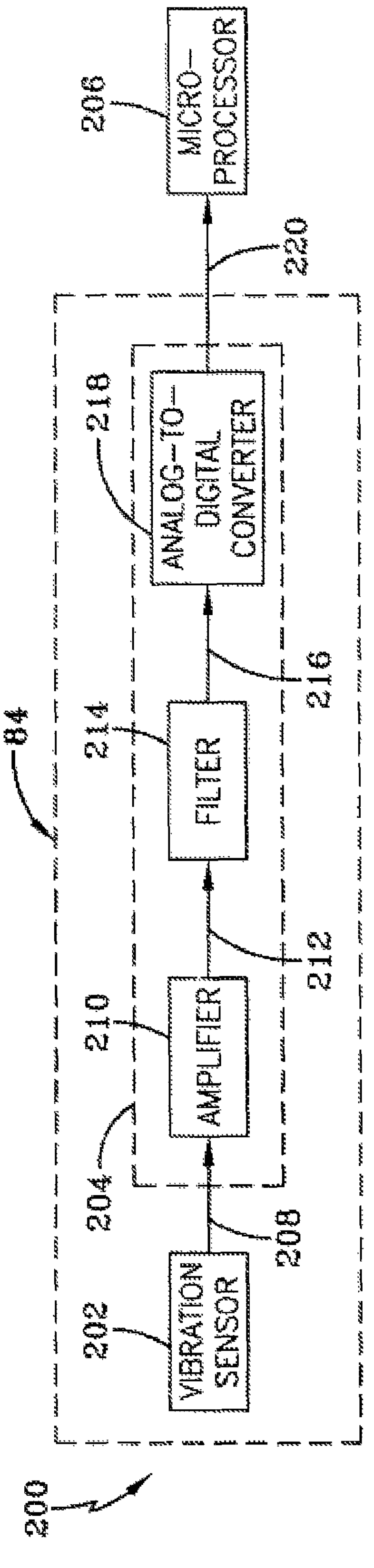
FIG. 4 is a schematic diagram of an activity sensor in the form of a vibration sensor incorporated into the mobile remote transmitter utilized with the operator system according to the prevent invention.

Referring now to FIG. 4, an exemplary detection circuit incorporated into the activity sensor 84 is designated generally by the numeral 200. Generally, after determining whether the carrying device 108 is active, the circuit 200 notifies the processor 72 of the mobile transmitter 70 whether to "Wake Up" or "Go to Sleep." Thus, the circuit 200 allows a user to go a longer time without changing or re-charging the batteries of the mobile transmitter 70. Alternatively, this circuit 200 may allow manufacturers to place smaller batteries in mobile transmitters 70 while still offering users an equivalent battery life.

The detection circuit 200 has three components; a vibration sensor 202, a format circuit 204, and a microprocessor 206. The vibration sensor 202 detects vibrations of the vehicle or carrying device 108 in which the mobile transmitter 70 is located. If placed properly, the vibration sensor 202 determines whether a vehicle's motor is active, even if the motor is merely idling. The vibration sensor 202 may be any element capable of detecting vibration. For example, in one particular embodiment the vibration sensor 202 may be a ceramic piezoelectric element. The vibration sensor 202 generates a vibration signal 208. In some embodiments, this vibration signal 208 will be an analog signal. In other embodiments, the vibration sensor 202 may include an analog-to-digital converter and the vibration signal 208 will be a digital signal. In any event, the vibration signal 208 is received and formatted by the format circuit 204 which prepares the vibration signal 208 for the microprocessor 206. The format circuit 204 receives the vibration signal 208 which may include an amplifier 210. If present, the amplifier 210 could be an op amp, a bipolar junction transistor amplifier, or another circuit that sufficiently amplifies the vibration signal. The amplifier 210 generates an amplified signal 212.

The format circuit 204 may also include a filter 214. The filter 214 accepts an input signal which may either be the vibration signal 208, or alternatively (if the amplifier 210 is present), the amplified signal 212. In any event, the filter 214 removes unwanted frequencies from the input signal and converts the input signal into a filtered signal 216. Note that the format circuit 204 may include embodiments where the amplifier 210 and filter 214 are transposed.

The format circuit 204 includes an analog-to-digital converter 218 which accepts an analog input signal. This analog input signal may be the vibration signal 208, the amplified signal 212, or the filtered signal 216, depending on the components present in the system. In any event, the analog-to-digital converter 218 converts the analog input signal into a digital signal 220. This digital signal 220 is then received by the microprocessor 206 which may be the same as the processor 72 or otherwise linked thereto. In any event, either or both processors provide the necessary hardware and software to enable operation of the sensor and the system 10. The microprocessor 206 evaluates the digital signal 220 to determine whether the vehicle 108 is active or not. It will be appreciated that the analog-to-digital converter 218 may be either internal or external to the microprocessor 206.

Figure 5:
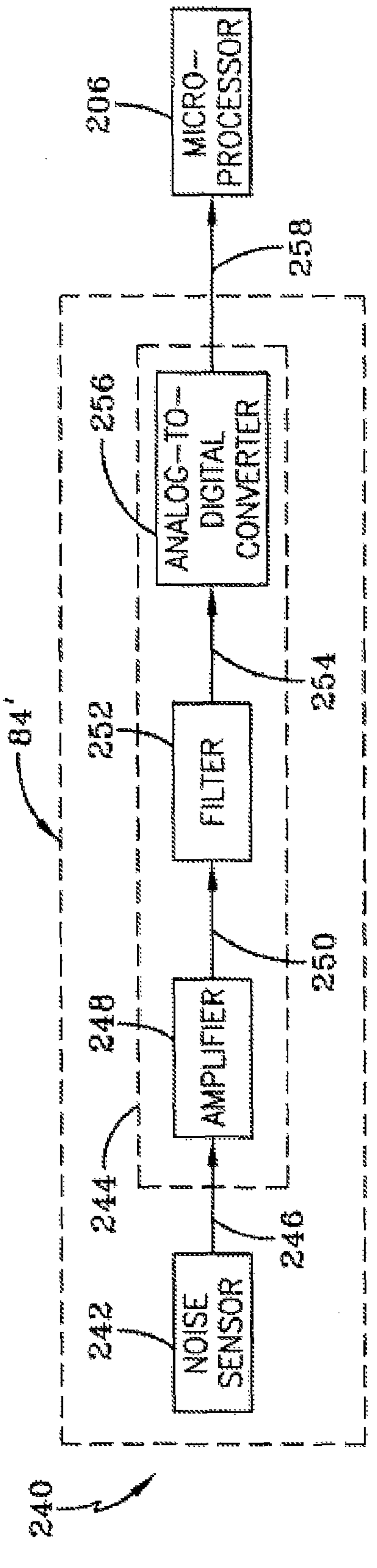
FIG. 5 is a schematic diagram of an activity sensor in the form of an electrical noise sensor incorporated into the mobile remote transmitter, utilized with the operator system according to the present invention.

Another embodiment of the present invention may utilize an activity sensor designated generally by the numeral 84' in FIG. 5 to aid in low-power usage. In such an embodiment, a detection circuit 240 detects whether a vehicle or carrying device 108 is active or not and includes a noise signal sensor 242, a format circuit 244, and the microprocessor 72/206 which has the same features as in the other sensor embodiment.

The noise sensor 242 detects electromagnetic waves and generates a noise signal 246. The noise sensor 242 could be an antenna with a simple coil of wire, a long rod, or the like. In understanding how the noise sensor works, it is useful to note that an automobile engine emits a noise signature when it is active. When the engine is not active, it does not emit the same noise signature if at all. For example, the noise sensor 242 may be an amplitude modulation (AM) detector. In other embodiments, the noise sensor 242 can detect a wide bandwidth noise signature from the electric emissions of spark plugs. Spark plugs normally have a repetition rate of around 70 to 210 Hz and about a 25 KV peak volt signal with a rise time in the microsecond range. In any event, the generated noise signal 246 is received by the format circuit 244 which prepares the noise signal 246 for receipt by the microprocessor 72/206. In one embodiment, the noise signal may be received by an amplifier 248. If present, the amplifier 248 may be an op amp, a bipolar junction transistor amplifier, or another circuit that sufficiently amplifies the noise signal 246 and generates an amplified signal 250.

As with the amplifier 248, the format circuit 244 may have another optional component such as a filter 252 which accepts an input signal. This input signal may be the noise signal 246, or alternatively (if the amplifier 248 is present), the amplified signal 250. In any event, the filter 252 removes unwanted frequencies or irrelevant noise from the input signal and generates a filtered signal 254. It will be appreciated that the amplifier 248 and the filter 252 may be transposed in the format circuit 244.

An analog-to-digital converter 256 receives an analog input signal. The analog input signal may be the noise signal 246, the amplified signal 250, or the filtered signal 254 depending on which components are present in the system. In any event, the analog-to-digital converter 256 converts the analog input signal into a digital signal 258 which is received by the microprocessor 72/206. The microprocessor 72/206 evaluates the digital signal 258 and determines whether the vehicle 108 is active or not. It will be appreciated that the analog-to-digital converter 256 may be either internal or external to the microprocessor 72/206.

Figure 6:
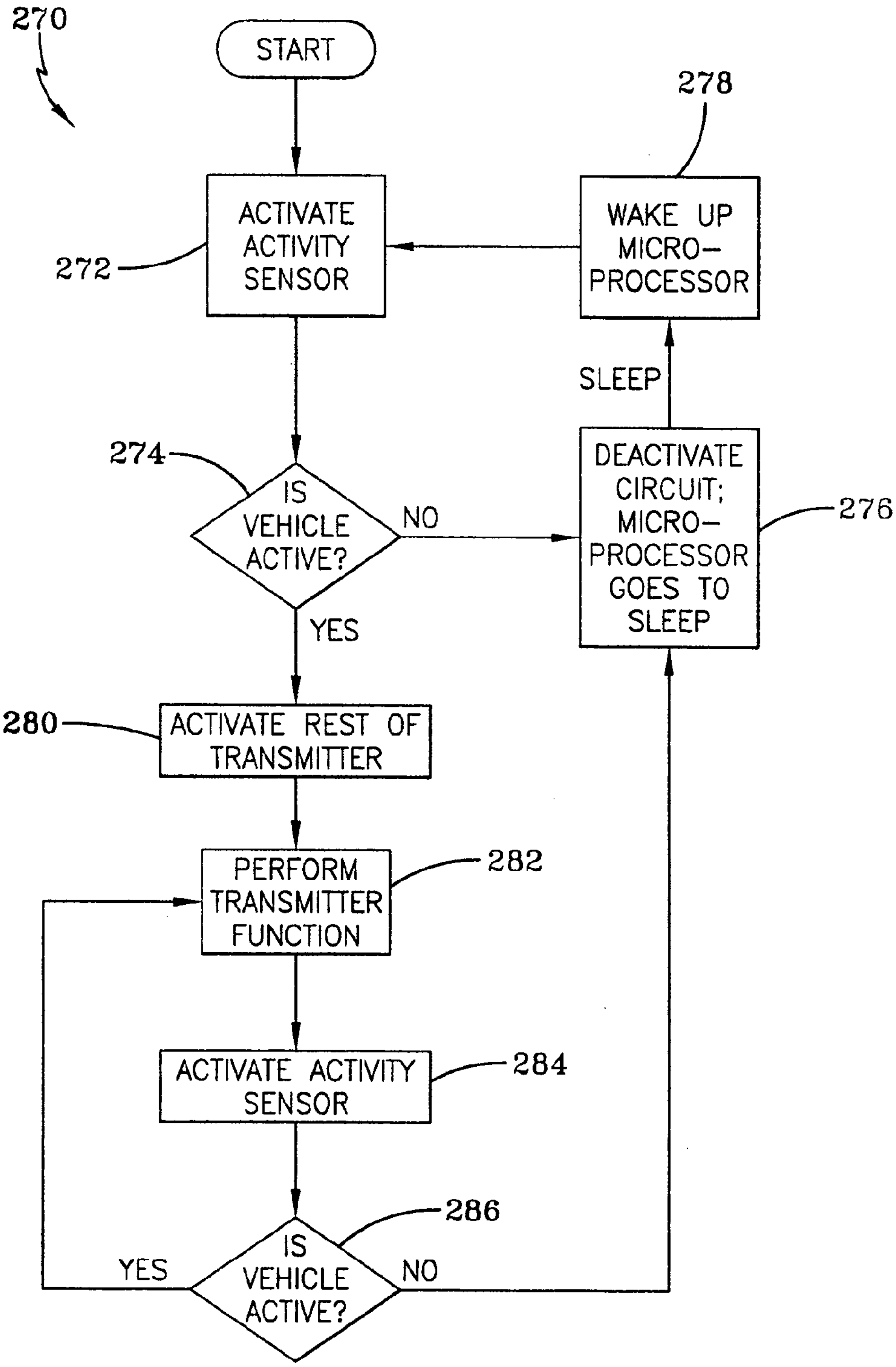
FIG. 6 is an operational flow chart for either of the activity sensors shown and described in FIGS. 4 and 5 to minimize power usage of the mobile remote transmitter.

Referring now to FIG. 6, the process steps for operation of the activity sensor 84/84' are illustrated in the flow chart designated generally by the numeral 270. As shown, the activity sensor 84/84' is first activated at step 272. As will be discussed in more detail as the description proceeds, the mobile transmitter 70 is learned to the base operator 34 and various variables and attributes are set internally to enable operation of the system 10. As part of the overall operation, the activity sensor 84/84' is utilized in such a manner that if the carrying device is determined to be in an "on" condition, then the transmitter 70 automatically generates the mobile signal at a specified rate, such as anywhere from one to 60 times per second. However, if the detection circuit determines that the carrying device is "off," then the transmitter is placed in a sleep mode so as to conserve battery power and the mobile signal is generated at a significantly reduced rate such as once every ten seconds, if at all.

In particular, at step 274, the microprocessor 206/72 queries the sensor 84/84' and determines if the vehicle is active or not. In making this determination, the microprocessor evaluates a changing voltage level or a predetermined voltage level according to a programmed detection protocol.

If the vehicle is not active, the microprocessor 206/72 "sleeps" and the rest of the circuit (including the activity sensor and RF transmitter) is deactivated at step 276. Next, the microprocessor periodically wakes up at step 278. This periodic awakening can be accomplished, for example, by programming a watchdog timer or other peripheral to wake up the microprocessor at specified intervals. If the sleep interval is relatively long for the sensor and related circuitry, then the circuit uses relatively little power. After the microprocessor is awakened, the activity sensor is energized again at step 272 and the microprocessor again queries whether the vehicle is active at step 274.

If the vehicle is determined to be active, then the microprocessor activates the mobile transmitter at step 280. Next, the transmitter performs the functions to be described at step 282. As will be described, these functions may include at least transmitting an RF signal to the base receiver 56. In any event, after the transmitter performs its function, the microprocessor again activates the sensor at step 284 and queries the sensor to determine if the vehicle is still active or not at step 286. If the vehicle is still active, the microprocessor again performs the transmitter function at step 282. If the vehicle is not active, the process returns to step 276 where the microprocessor deactivates the activity sensor and the rest of the transmitter, and then goes back to sleep.

Optimally, one would want to use a low power microprocessor to maximize the power management of a battery-powered device. Microprocessors enter the sleep mode and are periodically awakened by a watchdog time or other peripheral. While the microprocessor is in sleep mode, it may draw a current of merely a few micro-amps. If one wants to be even more efficient, one could add a switch to the vibration sensor and amplifier to switch off that part of the circuit to minimize current draw during sleep time of the microprocessor. As can be readily seen from this discussion, a long sleep period for the system results in extended battery life.

Those skilled in the art will appreciate that the sensor circuit could be very complex or very simple depending on the quality and signal needed. More appreciated though, will be the simplicity of these sensors that will allow them to be designed for minimal cost impact to the system. The vibration sensor 202 and/or its associated circuitry or the noise signal sensor 242 and/or its associated circuitry may be found in the engine compartment of a vehicle, in the mobile transmitter itself, or in some other region in or near the vehicle.

Figure 7:
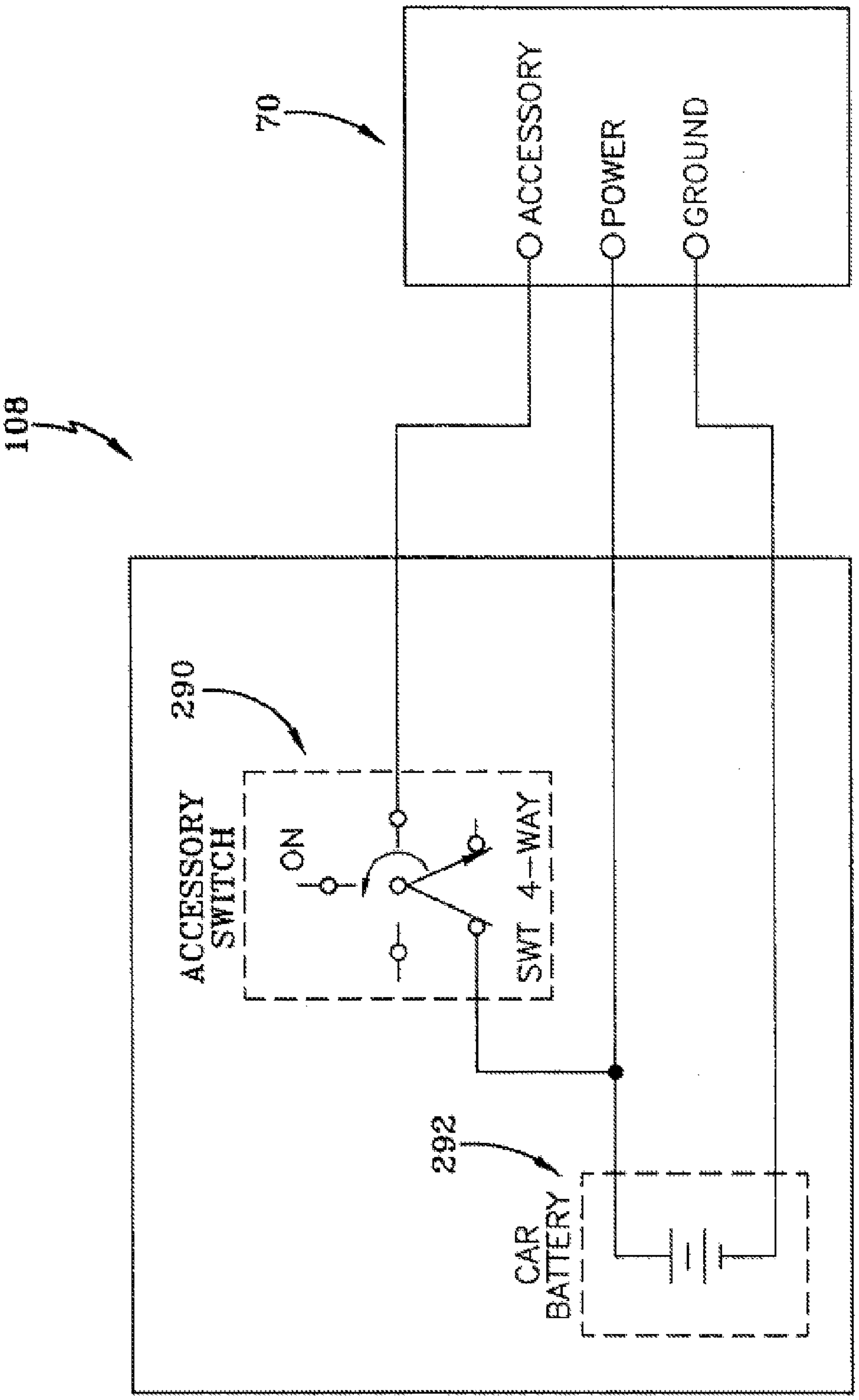
FIG. 7 is a schematic diagram of an exemplary mobile remote transmitter connected to the carrying device's power source.

Referring now to FIG. 7, and as previously discussed, the mobile transmitter 70 may be powered directly by the carrying device 108. In particular, the carrying device 108 includes an accessory switch 290 connected to a battery 292. The accessory switch is a four-way switch with at least an ignition position and an accessory position. The mobile transmitter 70 includes an accessory terminal, a power terminal, and a ground terminal. The ground terminal of the battery 292 is connected to the ground of the mobile transmitter and the power terminal is connected to the positive lead of the battery 292. The accessory terminal is connected to the accessory position such that when a key received by the switch is turned to the accessory position, then the mobile transmitter 70 detects such an occurrence and performs in a manner that will be discussed.

Having the mobile transmitter 70 connected directly to the power supply in a vehicle provides advantages over a solely battery-powered proximity device. The three-wire configuration may be employed wherein a single wire provides constant power from the vehicle's battery. Another wire connects the accessory switch to the vehicle and as such powers the mobile transmitter, and a third wire provides the common ground connection to the vehicle. All three of these signals are normally found in an automobile or electric vehicle. This three-wire set-up could possibly be minimized to a two-wire set-up if the common/ground is attached to a metal chassis of the vehicle. In any event, the mobile transmitter draws power from the constant power supply of the vehicle and uses the accessory circuit as a means of detecting of when the vehicle is energized. By employing such a configuration, there is no need to worry about a "sleep time" for the transmitter device since it is now powered directly by the vehicle battery. As such, the power supply is connected to the mobile transmitter at all times. If the accessory switch is on, the mobile transmitter remains in an active state. However, if the accessory device is off, the mobile transmitter enters a sleep mode to minimize current draw from the vehicle's battery. And it will further be appreciated that the mobile transmitter always has the ability to relay any change of state (active/sleep) information to the base receiver maintained by the operator.

Use of the mobile transmitter with either the ignition or activity sensor enables features such as an auto-open and auto-close functionality for the garage door operator. For example, detection of the vehicle changing from an off-state to an on-state while the carrying device is within the garage and the barrier is closed, automatically causes the barrier to open. And if the carrying device is moved into the garage and the vehicle is then turned off, the auto-close feature automatically closes the barrier after a predetermined period of time. For example, for the auto-open feature, the user enters their car and then turns on the ignition. The mobile transmitter then detects either the vibration or spark plug noise, or switching by a key to the accessory position—not necessarily the ignition position—and activates the rest of the circuit. The mobile transmitter then transmits signals to the base receiver relaying the information that the vehicle or carrying device is now active. Accordingly, the controller associated with the base receiver would receive this information and the operator would initiate opening of the barrier. At any time after activating the accessory circuit, the person can start the vehicle and leave the enclosed area. And the mobile transmitter's hands-free functions will close the door at an appropriate time.

The auto-close feature would work in the following sequence. The user would park the vehicle in the garage and turn the vehicle off. The mobile transmitter would stop sending signals to the base receiver. The base receiver and controller, not detecting the presence of the mobile signals, would then generate a "door close" command to the operator to close the door.

C. Sensitivity Settings/Mobile Manual Input

Generally, the mobile transmitter 70 determines whether the carrying device 108 is active and initiates communications with the base controller 52 via the base receiver 56. The mobile transmitter 70 is capable of generating various mobile signals 103, 132, 134, 136 (FIG. 3) with different transmit power levels and, if needed, with different identification codes to the base controller at an appropriate time. In response to the mobile signals generated by the mobile transmitter, the base controller 52 executes the appropriate door move or status change commands. It will be appreciated that FIG. 8 sets forth the operations of the mobile transmitter as it relates to button commands for programming or setting the desired sensitivity. The sensitivity level sets power levels to an approximate wireless signal range as to when a door is to be opened or closed. And the sensitivity level may dictate values for variable counters used for system sensitivity. For example, sensitivity settings may be very different for opening a garage door that is associated with a short driveway as opposed to one that has a very long driveway. Sensitivity settings may also be adjusted according to whether the garage door is located in an electrically noisy environment. A discussion is also provided as to how manual door move or cancellation commands are processed.

Figure 8A:
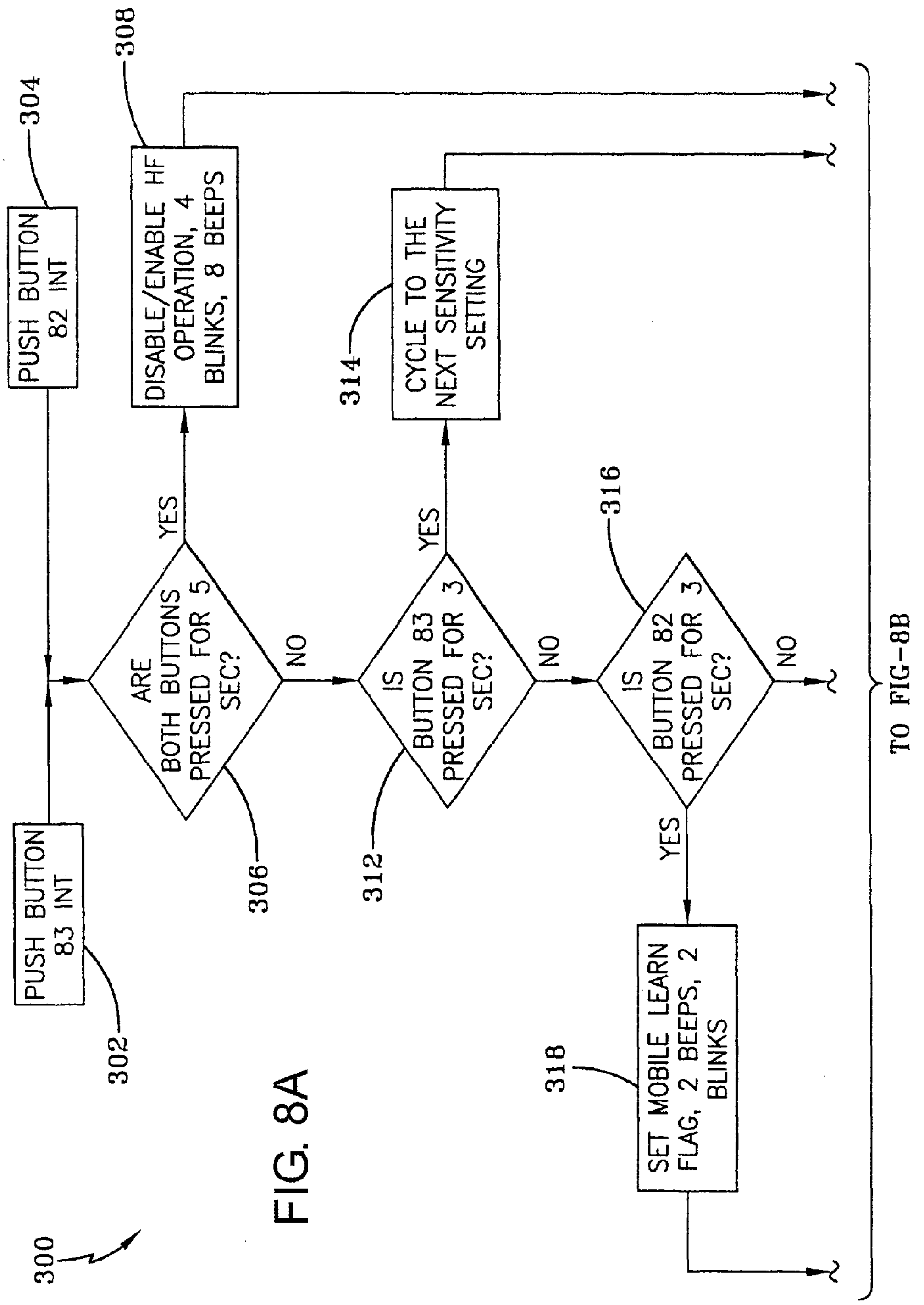
FIGS. 8A and 8B are operational flowcharts illustrating the initial programming and use of the mobile remote transmitter utilized in the operator system.
Figure 8B:
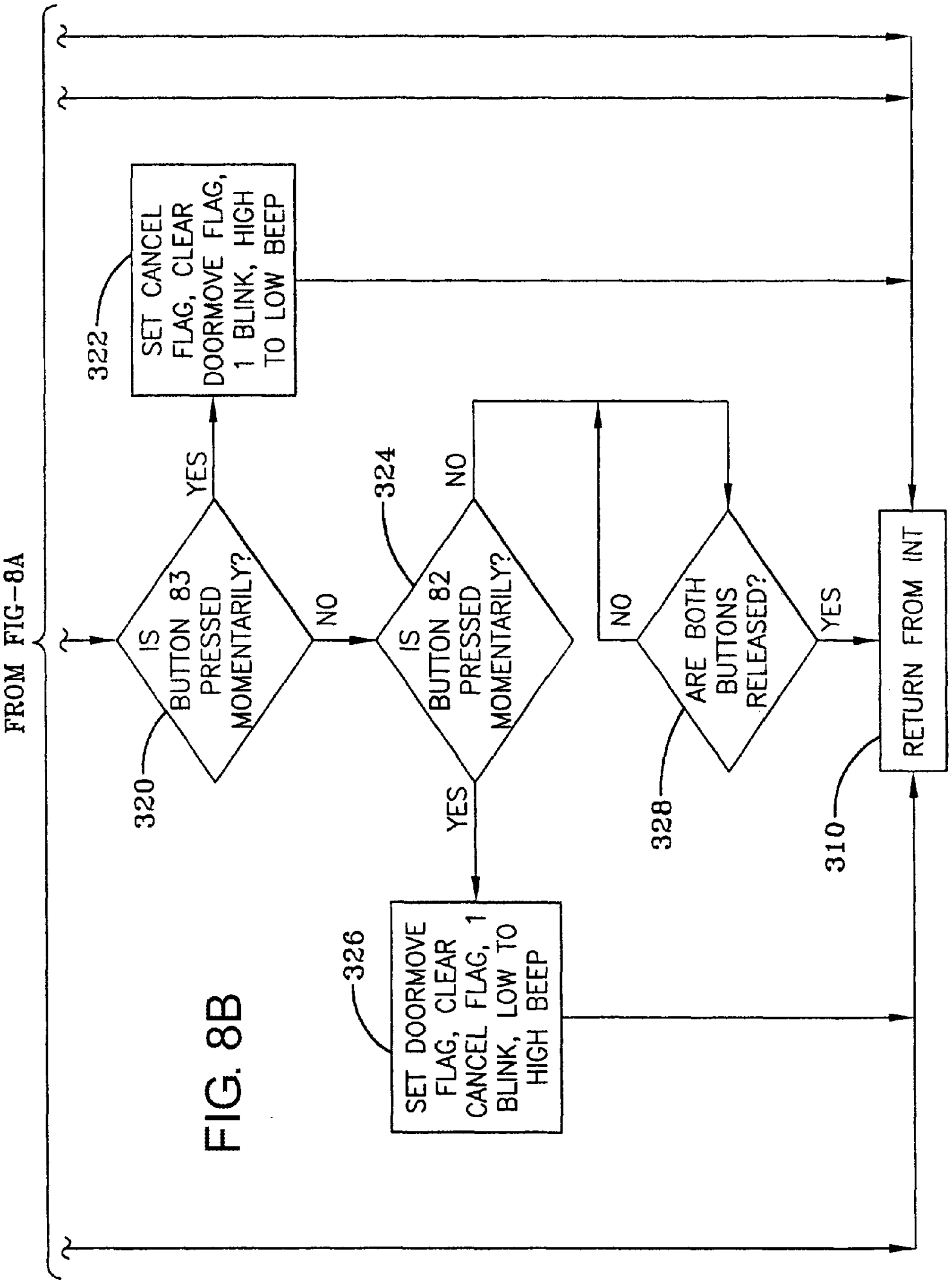

Referring specifically now to FIG. 8, it can be seen that a methodology for actuation of the buttons provided by the mobile transmitter 70 is designated generally by the numeral 300. As discussed previously, the mobile transmitter 70 includes a learn/door move button 82 and a sensitivity/cancel button 83. Accordingly, if the sensitivity/cancel button is actuated at step 302, or if the learn/door move button 82 is actuated at step 304, then the processor 72 makes an inquiry as to whether both buttons 82/83 have been pressed for five seconds or some other predetermined period of time. If so, the mobile transmitter 70 is disabled or enabled operation and this is confirmed by the four blinkings and eight beeps generated by the audio and light sources 94 and 96 respectively. It will be appreciated that other confirmation signals or sequence of beeps and blinking could be used. In any event, upon completion of step 308 the process returns to step 310 and the remote mobile transmitter 70 awaits a next button actuation. If at step 306 the buttons 82 and 83 are not pressed for the predetermined period of time then the processor 72 inquires at step 312 as to whether the sensitivity/cancel button has been pressed for a predetermined period of time such as three seconds. If the button 83 is held for more than three seconds, then at step 314 the processor 72 allows for cycling to a desired sensitivity setting. It will be appreciated that the mobile transmitter may be provided with one or more transmit power levels. In this embodiment, there are four power levels available and a different setting can be used for an open door command and a door close command such that a total of sixteen different sensitivity settings could be established. For example, the four power levels may be designated—from lowest to highest—as P0, P1, P2 and P3. Accordingly, one sensitivity setting could be OPEN=P0, CLOSE=P3; another as OPEN=P1, CLOSE=P3 and so on for a total of sixteen available settings. If at step 312 it is determined that button 83 has not been pressed for more than three seconds, the process continues to step 316 to determine whether the learn/doormove button has been pressed for a predetermined period of time, such as three seconds, or not. If the learn/doormove button has been pressed for more than three seconds, then at step 318 the mobile learn flag is set and this is confirmed by the beeping of the audio source 94 twice and the blinking of the light source 96 twice. Upon completion of the confirmation, the process proceeds to step 310 and normal operation continues. If, however, at step 316 it is determined that the learn/doormove button has not been pressed for three seconds, then the process continues to step 320 where the processor 72 determines whether the sensitivity/cancel button has been momentarily pressed or not. If the button 82 has been pressed, then at step 322 a cancel flag is set, a doormove flag is cleared, and a confirmation signal in the form of one blink by the light source 96 and a high to low beep generated by the audio source 94. And then the process is completed at step 310.

If at step 320 the sensitivity/cancel button 83 is not pressed momentarily, then the process inquires as to whether the learn/door move button 82 has been momentarily pressed or not at step 324. If the button 82 has been momentarily pressed, then at step 326 the doormove flag is set, the cancel flag is cleared and a confirmation is provided in the form of one blink and a low to high beep or audio tone. This step allows for execution of a manual doormove command if desired. If button 82 is not momentarily pressed at step 324, then the processor, at step 328, awaits for both buttons to be released. Once this occurs then the process is completed at step 310.

III. Mobile/Operator Operation

Figure 9:
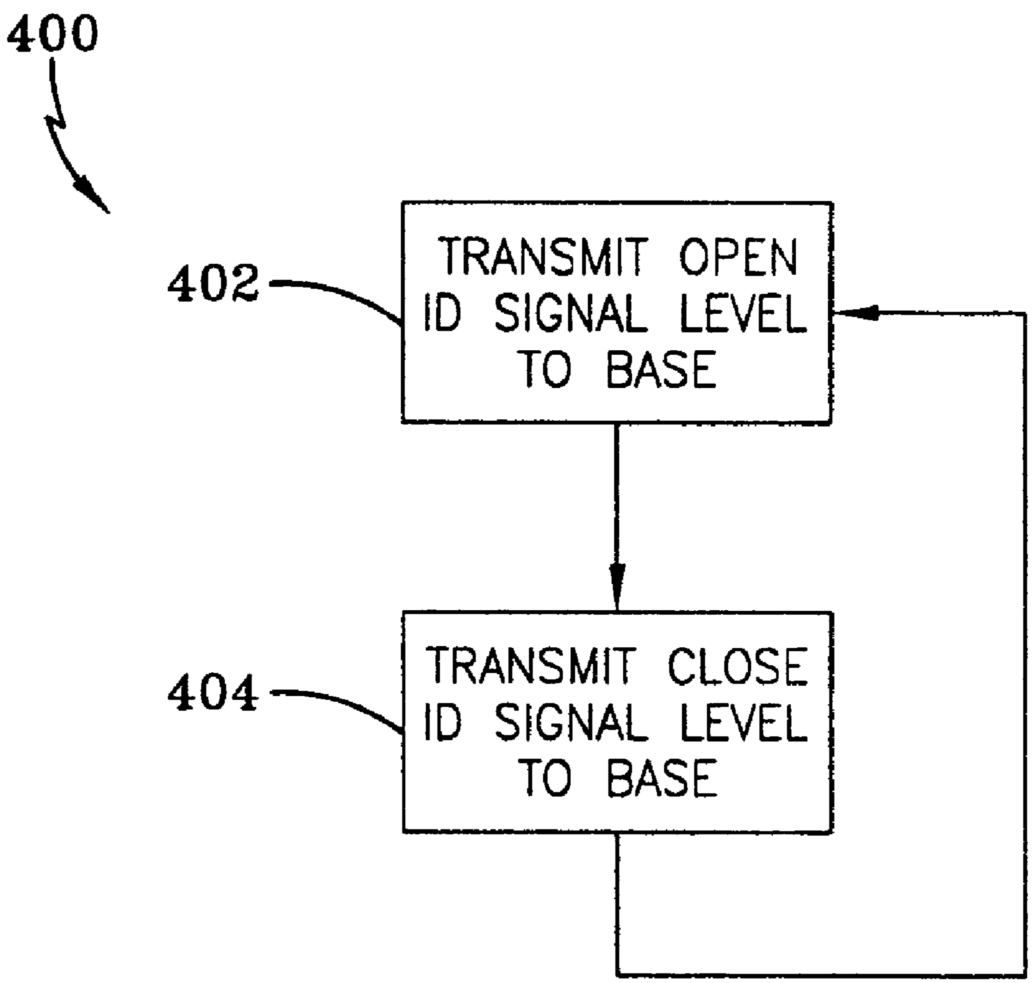
FIG. 9 is an operational flowchart illustrating the operation of the mobile transmitter utilized in the operator system.
Figure 10A:
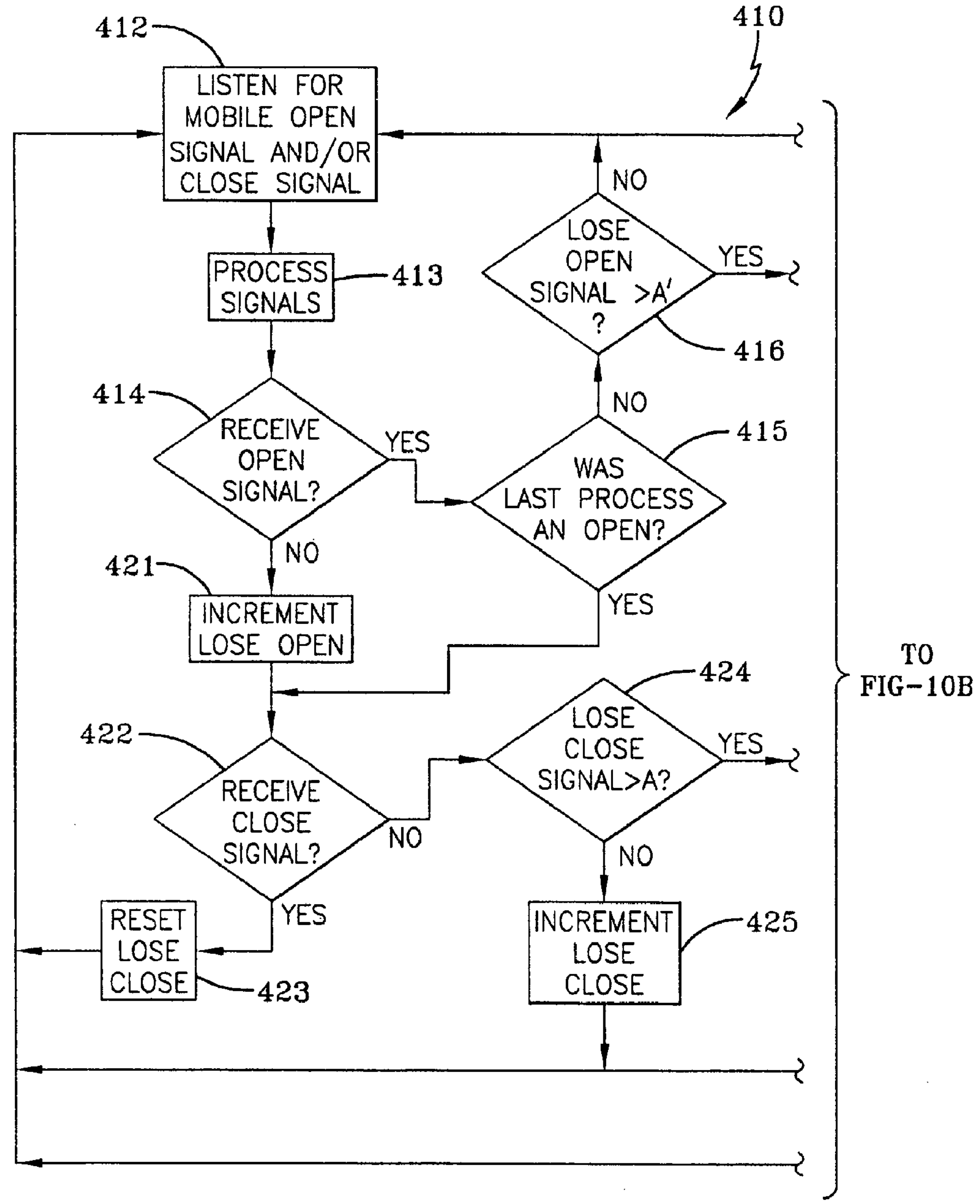
FIGS. 10A and 10B are an operational flowchart illustrating the operation of the base controller and the mobile transmitter.
Figure 10B:
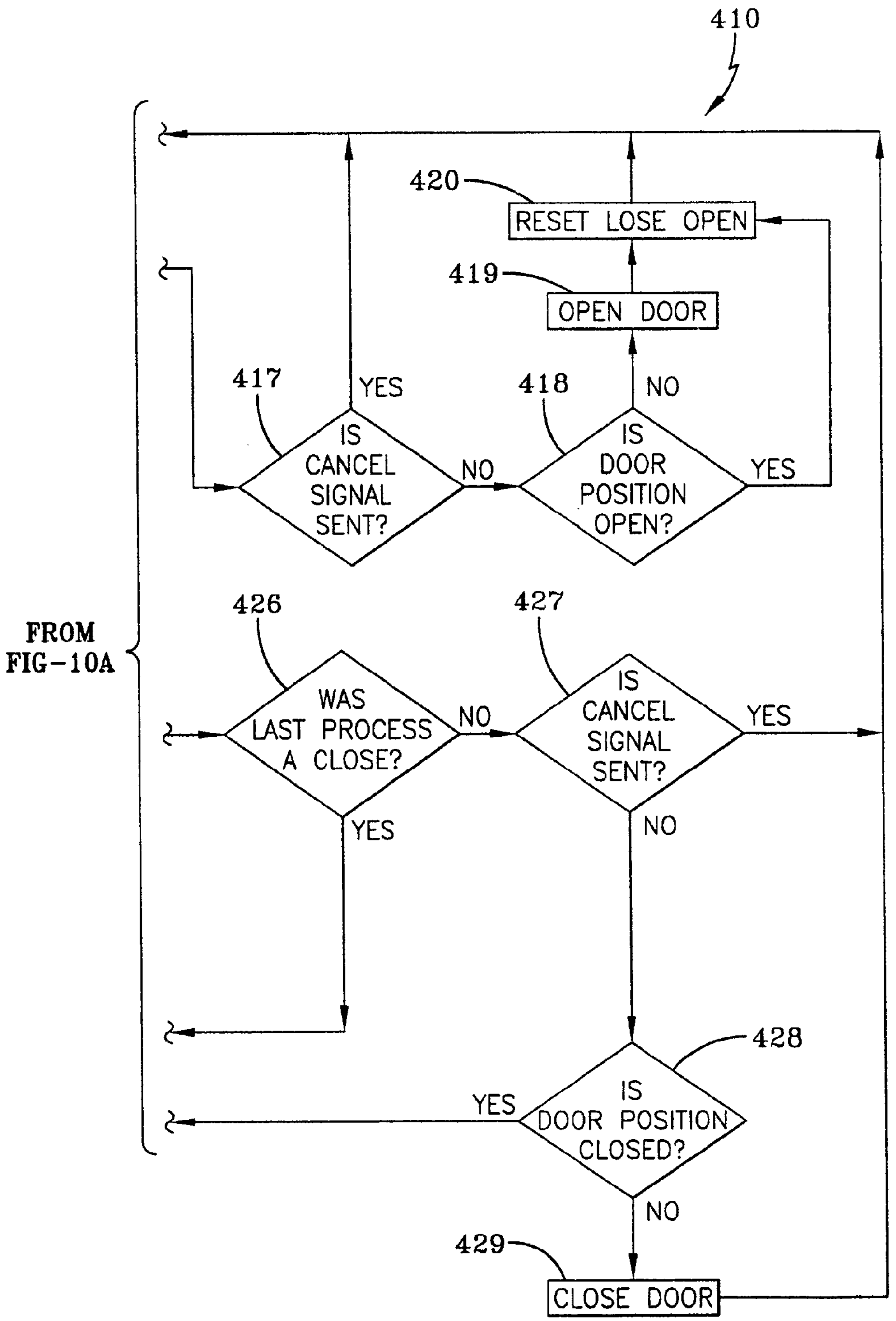

FIGS. 9-11 are directed to a first embodiment wherein the mobile transmitter somewhat periodically generates an open identification signal and then a close identification signal and wherein both are received by a base controller for the automatic opening and closing of the barrier.

Figure 12:
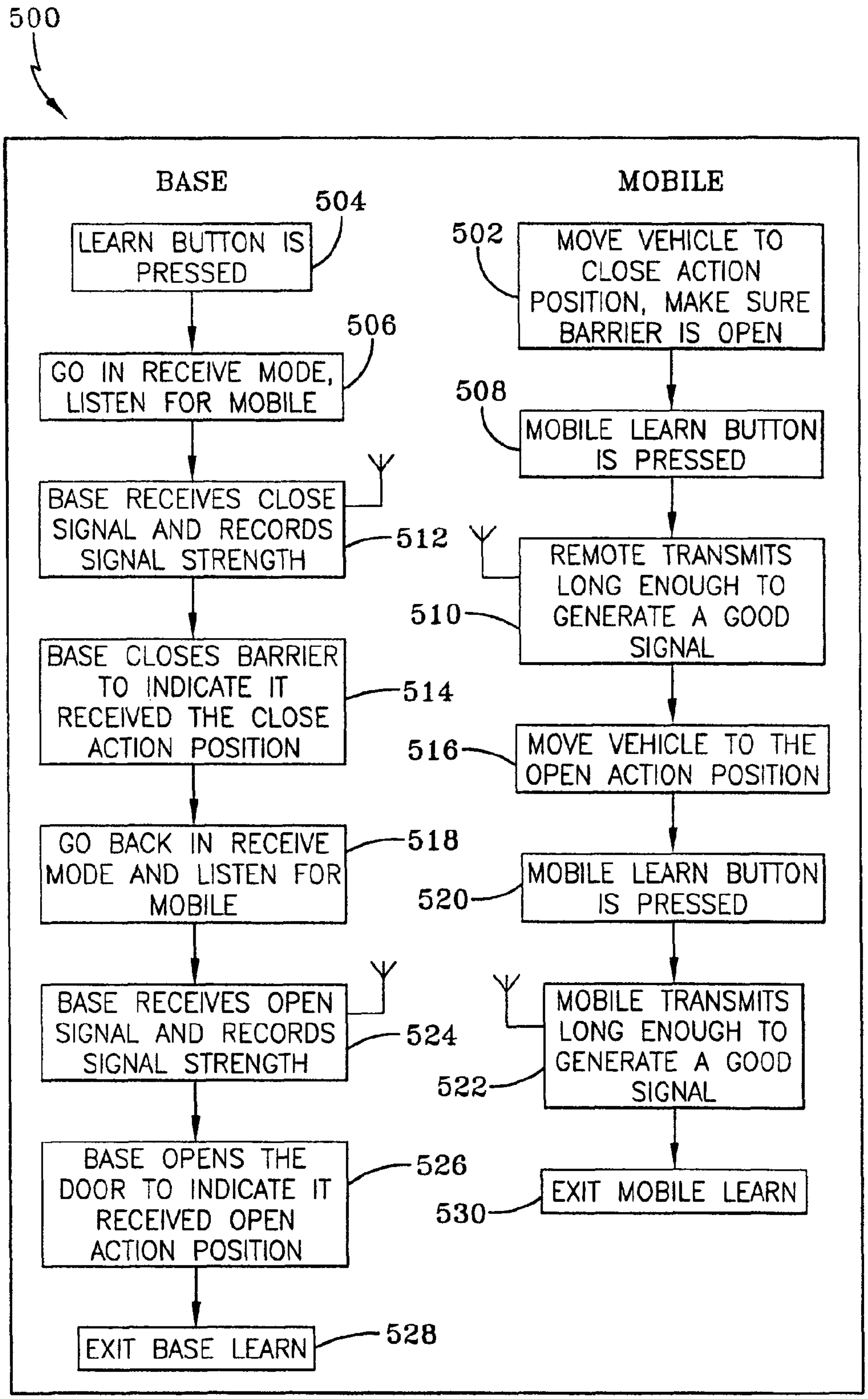
FIG. 12 is an operational flowchart illustrating profiling steps of the mobile transmitter and the base controller in an alternative embodiment of the present invention.
Figure 13:
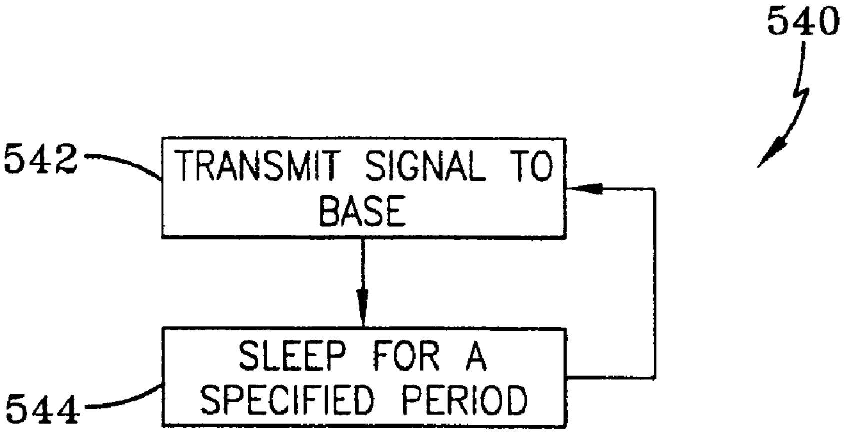
FIG. 13 is an operational flowchart illustrating the operation of the mobile transmitter utilized in the alternative embodiment.
Figure 14:
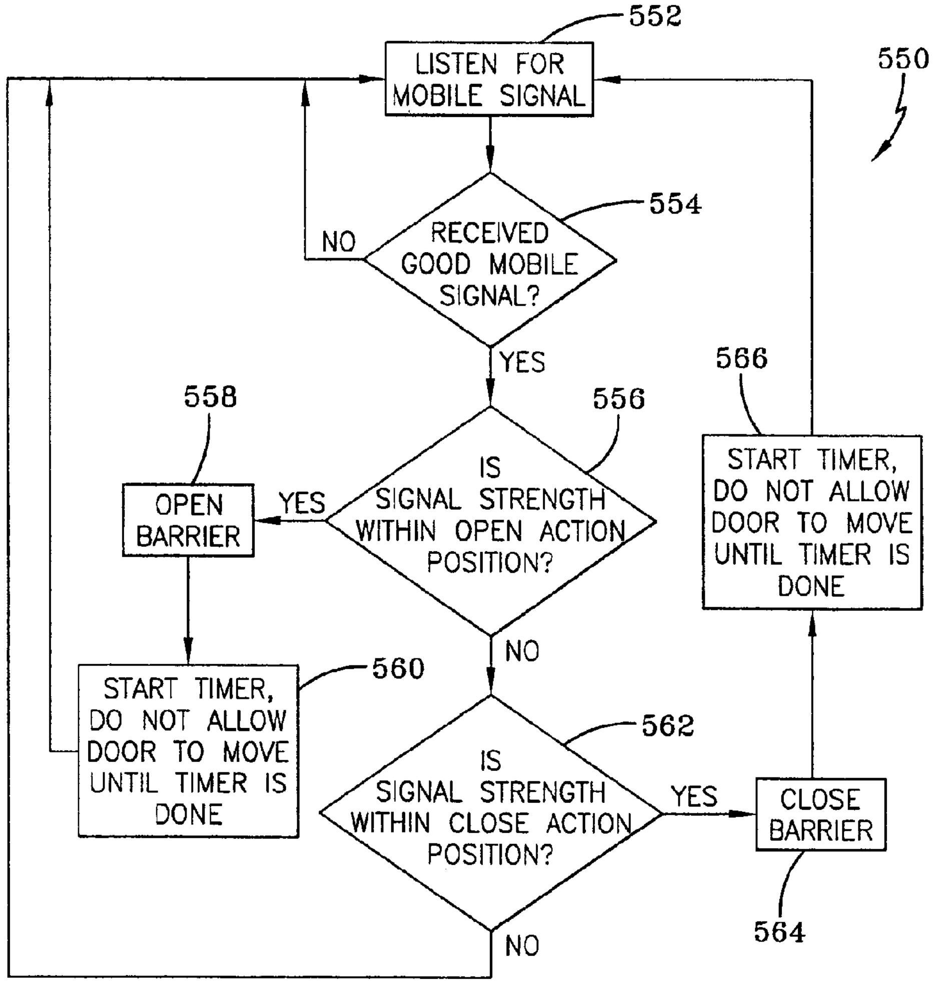
FIG. 14 is an operational flowchart illustrating the operation of the base controller in conjunction with the mobile transmitter utilized in the operator system according to the alternative embodiment.

FIGS. 12-14 are directed to an alternative embodiment which utilizes signal strength of the mobile transmitter for automatic opening and closing of the barrier. The hands-free methodologies discussed herein allow manual operation to open the door before leaving and closing the door after arriving. As used herein, the phrase manual operation refers to user actuation of a button on the wall station transmitter, the remote transmitter, the mobile transmitter or the keypad transmitter.

A. Dual Transmitter Signals

Referring now to FIG. 9, it can be seen that a methodology for operation of the mobile transmitter 70 is designated generally by the numeral 400. Ideally, the mobile transmitter is powered by a self-contained battery that may or may not be re-chargeable. Accordingly, the mobile transmitter is always on and generating identification signals. At step 402, the mobile emitter 76 (FIG. 2) generates a mobile signal 78 in the form of an open identification (ID) signal that is receivable by the base receiver 56. Subsequently, at step 404, the emitter 76 generates a close identification signal that is also receivable by the base receiver 56. Upon completion of step 404 the process returns to step 402. It will be appreciated that the time period between steps 402 and 404 may randomly change so as to avoid radio frequency interference with other remotes. As previously discussed, the open identification signal and the close identification signal may be transmitted at equal or different power levels, but in either case the base receiver is able to distinguish between the two. The setting of the power levels, as discussed in relation to FIG. 8, facilitates operation of the system 10. Initially, the identification signals are established at the manufacturing facility, but the amplitude of the signals are adjustable by the consumer or installer. In addition to the open and close identification signals it will be appreciated that the mobile transmitter can also send a “command” signal when activated manually. In any event, each identification signal can have a different signal strength (amplitude) wherein the present embodiment allows for four signal strengths for each identification signal. Of course, any number of different signal strengths could be used. The amplitude settings can be programmed by the consumer or the installer with a program button responding to audible or visual signals provided by the respective sources on the transmitter. It is believed that the consumer or installer will set the individual signal strengths differently so that the arriving identification signal—the signal used to open the barrier—will have a higher strength signal than the departing identification signal—the signal used to close the barrier. Accordingly, the arriving identification signal causes the base controller to generate a “command” to open the door sooner and lack of detection of the lowest strength identification signal causes the base station to generate a “command” to close the door sooner. However, based upon the customer’s needs, both identification signals could be the same strength. As will be discussed, it is possible that hands-free control of an actuation system, such as a garage door, could be accomplished with a single identification signal. In the alternative, if the mobile transmitter's operation is controlled by the activity sensor 84, then the steps 402 and 404 are only implemented when the carrying device is on. When the carrying device is off, the open and close identification signals are not generated, but a manual button push would generate the corresponding command signal.

Referring now to FIG. 10, a basic methodology for operation of the base controller 52 is designated generally by the numeral 410. Initially, it will be appreciated that the remote mobile transmitter 70 is learned to the controller 52 in a conventional fashion by actuation of learn button 59 on the controller and actuation of one of the buttons 82/83 on the transmitter 70. Of course, other learning methods could be used. In this basic methodology, the base controller maintains a variable identified as "last process," which is initially set equal to "open" wherein this variable may be changed to "close" when appropriate. Other variables may be maintained to supplement and enhance operation of the system. For example, "lose open" and "lose close" variable counts are maintained to ensure that the mobile transmitter is in fact out of range of the base operator before any specific action is taken.

The controller 52 monitors frequencies detected by the base receiver 56, and in particular listens for an open signal and/or a close signal generated by the mobile transmitter at step 412. Next, at step 413 the methodology begins processing of the signals. At step 414 the base controller determines whether an open signal has been received or not. If an open signal has been received, then the controller 52 investigates the "last process" variable at step 415 to determine whether the last course of action was an "open" door move or a "close" door move. If the last process variable was not "open," then at step 416, the controller queries as to whether a process variable "lose open" is greater than A'. This query is made to ensure that an inappropriate action is not taken until the mobile transmitter is in fact away or out of range of the base controller. If the lose open variable is not greater than A', then the process returns to step 412. However, if the lose open variable is greater than A', the controller queries as to whether a cancel signal has been sent by the mobile transmitter or not at step 417. If a cancel signal has been sent, then the process returns to step 412 and any door move command that would otherwise be generated by the controller is not sent. If a cancel signal has not been received at step 417, then at step 418 the controller 52 determines whether the door position is open or not. As noted previously, the controller is able to detect door position by use of mechanisms associated with the door movement apparatus. In any event, if the door position is open, the process continues to step 420 and the variable lose open is reset and then the process returns to step 412. However, if the door position is not open, as determined at step 418, then at step 419 the controller executes an open door command and the variable last process is set equal to open. And at step 420, the variable lose open is reset to a value, typically zero. Upon completion of step 420, the process returns to step 412.

Returning to step 414, if an open signal is not received, then at step 421 the lose open variable is incremented and the process continues at step 422. Or if at step 415 the last process variable is designated as open, then the process continues on to step 422 where the controller determines whether a close signal has been received or not. If a close signal has been received, then a "lose close" variable is reset and set equal to zero at step 423 and the process returns to step 412. However, if at step 422 a close signal has not been received, then the process, at step 424, queries as to whether the lose close variable value is greater than a designated variable value A. If the answer to this query is no, then at step 425 the lose close variable is incremented by one and the process returns to step 412. The lose close variable is used so that a specific number of consecutive close signals must be lost or not received before an actual close door move command is generated. Accordingly, if the lose close signal is greater than variable A at step 424, the controller queries as to whether the variable last process was a close at step 426. If so, then the process returns to step 412. As will be appreciated, this procedural step prevents the base controller from closing/opening the door or barrier multiple times when the mobile transmitter is in a transitional position.

If at step 426 the last process variable is not equal to close, then at step 427 the process inquires as to whether a cancel signal has been received or not. If a cancel signal has been received, then the process returns to step 412. If a cancel signal has not been received, then at step 428 the controller inquires as to whether the door position is closed or not. If the door position is closed, then the process returns to step 412. However, if the door position is not closed, then at step 429 the base controller generates a door close command and the door is closed and the variable last process is set equal to close, whereupon the process returns to step 412.

As can be seen from the methodology 410, a simple use of an open signal and a close signal automatically generated by an active mobile transmitter enables the hands-free operation so as to open and close a barrier depending upon the position of the mobile transmitter and whether the position of the door is determined to be open or closed. The disclosed methodology is simple to implement and has been found to be effective in operation for most all residential conditions. It will be appreciated that the methodology shown in FIGS. 10A and 10B and described above is adaptable for use with a single identification signal. In such an embodiment, the steps 414 and 422 would be replaced with a single query as to whether a signal from the mobile transmitter has been received or not. If a signal is received, the process would reset the lose close variable (step 423) and continue to step 415, where a YES response will direct the process to step 424. If a signal is not received, then the process will go directly to step 424. Step 425 would also increment the lose open variable (step 421).

Figure 11A:
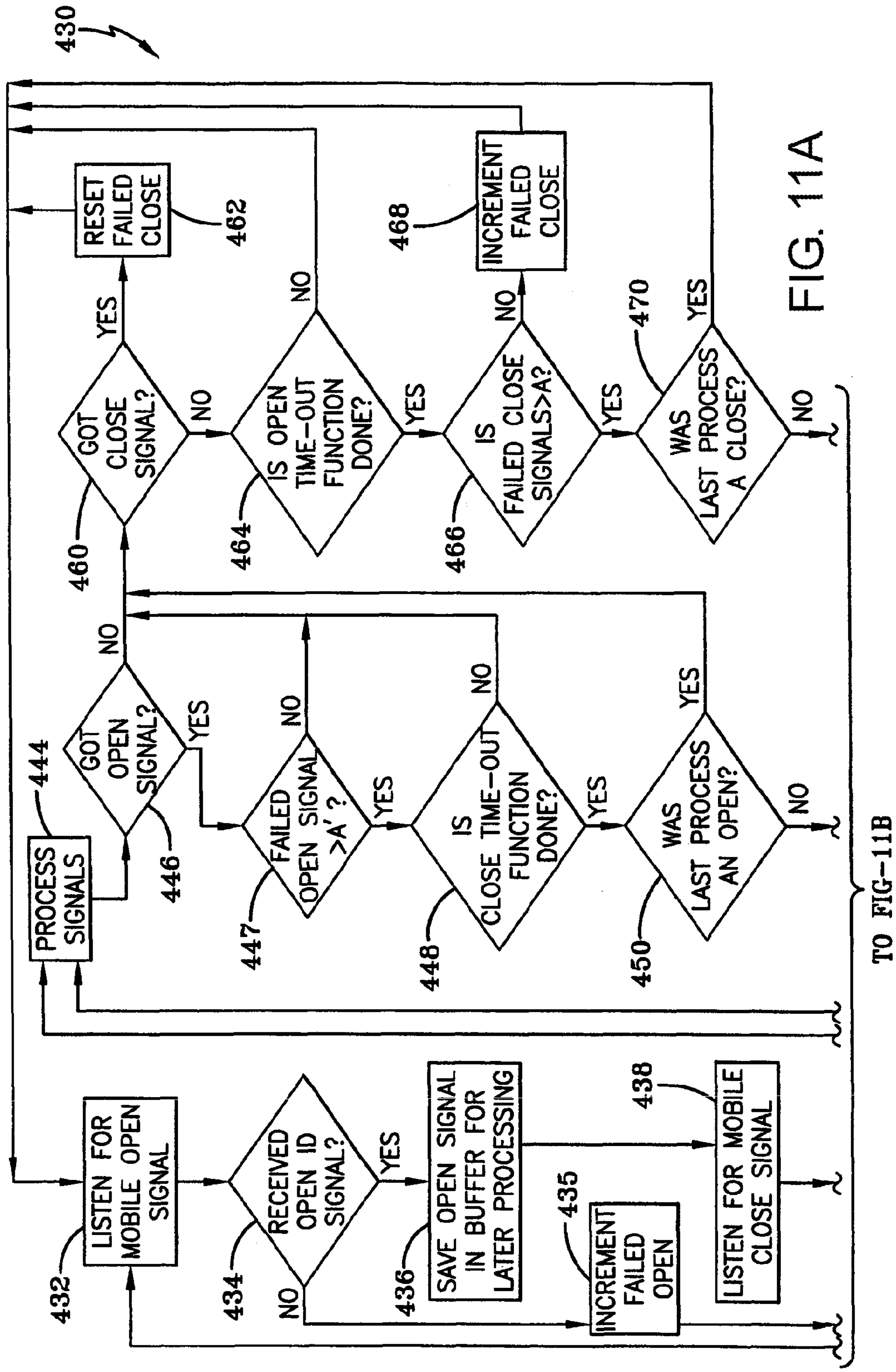
FIGS. 11A and 11B are a more detailed operational flowchart illustrating the operation of the base and the mobile transmitter.
Figure 11B:
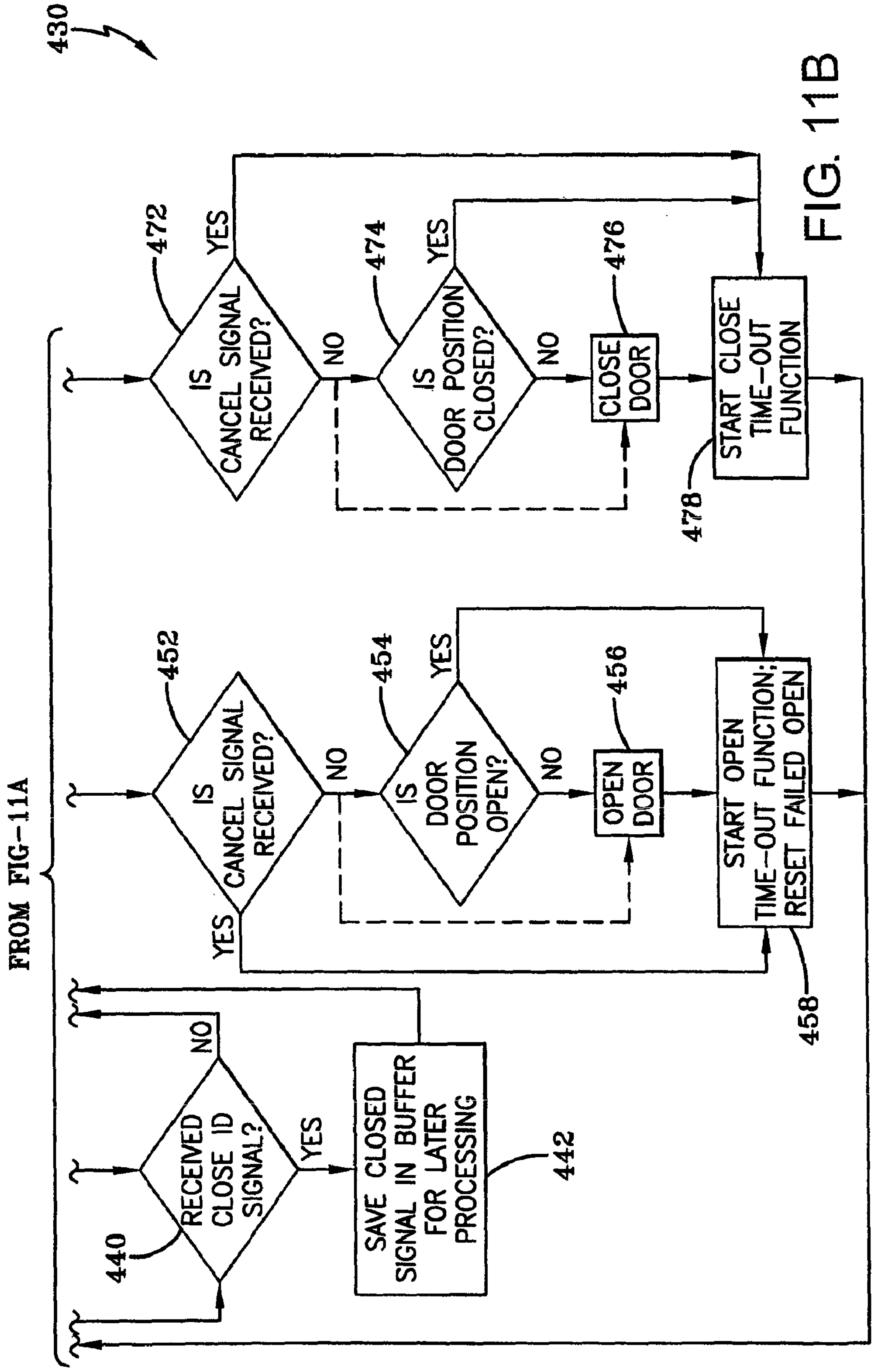

Referring now to FIGS. 11A and 11B, a more detailed methodology for operation of the base controller 52 is designated generally by the numeral 430. As with the basic operation, the remote mobile transmitter 70 may be learned to the controller 52 in a conventional fashion by actuation of a learn button 59 on the controller and actuation of one of the buttons 82/83 on the transmitter 70. And in the detailed version, the base controller utilizes information as to whether the door is in an open or closed condition, and whether the last course of action was an open or close movement. Other variables may be maintained to supplement and enhance operation of the system. Additionally, at least one door move time-out function and ideally two time-out functions are used so as to allow for ignoring of the mobile signals during an appropriate period following a door move. As used here-in, the time-out function may be implemented with a timer maintained by the controller having a specific time value, or the time-out function may be associated with an expected number of mobile signals to be received, wherein the frequency of the generated mobile signals is known by the base controller and a count associated therewith. In other words, after a door move operation, although mobile signals continue to be received by the base controller, the time-out function prohibits mobile signals from being acted upon until completion thereof.

As a first step 432, the controller 52 listens for the open identification signal. Next at step 434, the controller monitors for receipt of the open identification signal. If an open identification signal is not received, then at step 435 a variable failed open is incremented by one and the process continues to step 440. However, if an open identification signal is received, then the process proceeds to step 436 where the open identification signal is saved in an appropriate buffer for later processing. Next, at step 438 the base operator listens for a close identification signal generated by the mobile transmitter. Next, at step 440, upon completion of step 438, or if at step 434 an open identification has not been received, then the base operator determines whether a close identification signal has been received or not. If a close identification signal is received, then at step 442 the close identification signal is saved in an appropriate memory buffer for later processing.

Upon completion of step 442, or if the close identification signal is not received at step 440, the process continues to step 444 for the purpose of processing the identification signals whether they have been received or not. Accordingly, at step 446 the base operator controller 52 determines whether an open identification signal had been received or not. Upon completion of this query at step 446, the buffer associated with the open identification signal is cleared. In any event, if an open identification signal is in the buffer, then at step 447, the controller determines whether the failed open variable is greater than A' or not. If not, then process proceeds to step 460. If the failed open variable is greater than A', then at step 448 the controller 52 determines whether a close time-out function has elapsed or not. The close time-out function or timer, which has a predetermined period of time, is started after completion of a door close operation. In any event, if the close time-out function has elapsed, then at step 450 the controller determines whether the last course of action was a door open movement. If the last course of action was not an open movement, then at step 452 the controller queries as to whether a cancel signal has been received or not. If a cancel signal has not been received, then at step 454 the controller inquires as to the status of the door position. If the door is closed—not open—then at step 456 the base controller generates an open door move command at step 456. And then at step 458 an open time-out function is started and the variable failed open is reset. Upon completion of step 458 the process returns to step 432.

Returning to step 452, if a cancel signal has been received then the process immediately transfers to step 458, the open time-out function is started, and the process returns to step 432. It will be appreciated that in the present embodiment, the operator controller may know the position of the door. This is by virtue of position detection mechanisms internally or externally associated with the base operator 34. In the event such position detection mechanisms are not available, then step 454 may be ignored as indicated by the dashed line extending from query 452 to command 456. In any event, if the door position, at step 454, is determined to be open, then step 456 is bypassed and at step 458 the open time-out function is started.

If at step 446 an open signal is not stored in the buffer, or at step 448 the close timer is not completed, or if at step 450 the last action was an open movement, then the process continues to step 460. At step 460 the controller inquires as to whether the close signal buffer has a close signal retained therein. If a close signal has been received, then at step 462 the variable failed close is reset and the process returns to step 432. However, if at step 460 a close identification signal is not in the buffer, then the process proceeds to step 464. It will be appreciated that upon each completion of step 460, the close signal buffer is cleared. In any event, at step 464 the controller inquires as to whether the open time-out function has elapsed or not. If not, then the process returns to step 432. If the open time-out function has elapsed at step 464, then at step 466 the controller inquires as to whether the variable failed close is greater than a predetermined value A. This variable is utilized to prevent any false closings because of radio frequency interference, other signal interference, or null values. If the failed close variable is not greater than A, then at step 468 the failed close variable is incremented by one and the process returns to step 432. However, if at step 466 the failed close variable is greater than A, then the controller makes an inquiry at step 470 as to whether the last course of action was a door close movement. If the last course of action was a door close movement, then the process returns to step 432. However, if at step 470 the last course of action was not a door close movement, then the process continues to step 472 to determine whether a cancel signal has been received or not. If a cancel signal has been received, then the close time-out function is started at step 478 and then the process continues on to step 432.

If a cancel signal has not been received at step 472, then the process proceeds to step 474 to determine whether the door position is closed or not. If the door position is not closed, then at step 476 a door close command is generated by the base controller and then at step 478 the close time-out function is started. However, if the door position is closed, as determined at step 474, step 476 is bypassed and steps 478 and 432 are executed. If the controller is unable to determine whether the door position is open or closed, then step 474 is bypassed and step 476 is executed.

From the foregoing descriptions it will be appreciated that if the door or barrier is in a closed condition when the two identification signals arrive, the base controller sends a command to the motor controls to open the door and start a time-out function to prevent the door from closing for a predetermined period of time regardless of any additional identification signals received. If the door is determined to be open when the identification signals are received by the base receiver, the base controller will not send a command to the motor controls until the base controller no longer receives a close identification signal. Once the door is closed in this scenario, the time-out function is initiated and the base controller ignores any open identification signals received during the time-out function period. As a result, the base controller will not allow an open door to close until the time-out function is complete, nor will a closed door be allowed to open until the time-out function is complete. The mobile transmitter close identification signal must go out of range to close the door, thus the open identification signal will not be recognized until after the transmitter has been out of range for a predetermined period of time. In other words, only the loss of the close signal after completion of the time-out function will result in closing the door, regardless of what the open signal is doing. And the loss of the open signal for the time-out function period must occur before receipt of an open signal will be acted upon by the base controller.

In the event the mobile transmitter is connected to the accessory circuit of a carrying device, the mobile transmitter will send identification signals as soon as key movement to an accessory or position is detected. In essence, turning the ignition on initiates the processing as set forth in FIGS. 10 and 11. In a similar manner, when the carrying device's key is moved to the off position, presumably when the carrying device is in the garage, the normal processing by the base controller will initiate a door close operation unless the door has already been closed.

It will also be appreciated that the remote mobile transmitter may be activated or manually turned on when one arrives closer to the destination so as to begin sending identification signals. Such a feature would also allow for further power savings on the mobile transmitter.

B. Signal Strength

In FIGS. 12-14 an alternative procedure utilized by a mobile transmitter that generates periodic signals can also be implemented. Generally, in this embodiment the mobile transmitter sends a single identification signal to the base controller which determines the signal strength associated with a particular position of the carrying device that carries the mobile transmitter and opens or closes the door accordingly.

Referring now to FIG. 12, the methodology for learning the signal strengths associated with opening and closing the barrier is designated generally by the numeral 500. A sequence of operations associated with both the base and the mobile devices are side-by-side and the following description sequences through the normal operational steps; however, it will be appreciated that the steps may be performed in a slightly different order and still allow for the learning of the profiles associated with the mobile transmitter. In any event, at step 502 the user moves the carrying device to a close action position with the barrier placed in an open position. Next, at step 504, the learn button 59 on the base controller is actuated and the controller 52 enters a receive mode to listen for the mobile transmitter at step 506. Next, at step 508, the learn button 82 on the mobile transmitter 70 is pressed. At step 510, the mobile transmitter transmits long enough to generate a high quality signal. At step 512 the base receiver 56 receives and records a close signal strength and stores this in the memory 54. And at step 512, the base controller closes the barrier to indicate that it has received the close action position to be associated with the mobile transmitter.

At step 516, the user moves the vehicle or carrying device to an open action position and at step 518 the base controller returns to a receive mode and listens for the next actuation of the mobile transmitter. Once the desired open action position is achieved, the user actuates the learn button on the mobile transmitter and an appropriate signal is transmitted at step 522 long enough to generate an adequate signal. Next, at step 524 the base controller acknowledges receipt of the action position and records the appropriate open signal strength at step 524. Next, at step 526, the base controller opens the door to indicate that it has received the open action position. Finally, at step 528 the base controller exits the learn mode and the mobile transmitter exits its learn mode at step 530.

Confirmation and exiting of these various steps may be confirmed by generation of audible beeps or visual flashing of the lights associated with both the mobile transmitter and the base controller. Once the profile procedure has been learned, the mobile transmitter generates signals based upon whether the activity sensors 84/84' are detecting operation of the carrying device.

Referring now to FIG. 13, it can be seen that the operation of the mobile transmitter is designated generally by the numeral 540. At step 542, the mobile transmitter transmits a mobile signal to the base controller. Subsequently, at step 544, the transmitter sleeps for a specified period of time and then returns to step 542. Accordingly, a mobile signal is periodically generated by the mobile transmitter to avoid contention with other remote or mobile transmitters. And the sleep period may vary randomly after every transmission. If the remote runs on batteries, it will never turn off unless the remote utilizes an activity sensor as previously described. As discussed, this would allow the remote to conserve power by sleeping when the vehicle is not active and a signal is not needed. Alternatively, the mobile transmitter could be powered by the vehicle's power supply and would know when the vehicle is active and as such would shut down the mobile transmitter when the vehicle is off. The mobile transmitter will use known methods of digital modulation that comply with the general requirements as set forth above when it is transmitting an appropriate signal to the base controller. It could also use the method of encryption previously referred to. And as in the previous embodiment, the mobile transmitter could be actuated manually by pressing the appropriate button any time a door move command is desired or if hands-free operation is to be temporarily disabled.

Referring now to FIG. 14, operation of the base controller for this alternative embodiment is designated generally by the numeral 550. At step 552, the base controller 52 awaits or listens for the mobile signal generated by the mobile transmitter 70. Next, at step 554, the controller 52 queries as to whether the base receiver 56 has received a good mobile signal or not. If not, then the process returns to step 552. But, if a good mobile signal is received at step 554, then at step 556 the base controller 52 determines whether the signal strength associated with the receive signal is within the open action position. If so, then at step 558 the base controller 52 generates a command received by the motor to open the barrier. Upon completion of the open barrier movement the controller 52 at step 560 initiates or starts a timer for a predetermined period of time so as to prevent the barrier from moving until the time period has elapsed and then the process returns to step 552.

If however, at step 556, it is determined that the received signal strength is not within the open action position, then the process proceeds to step 562 to determine whether the received signal strength is within the close action position. If the received mobile signal is not within the close action position, then the process returns to step 552. However, if the signal strength of the mobile signal is determined to be within the close action position, then at step 564 the barrier is closed. Finally, at step 566, a timer is started for a predetermined period of time so as to prevent the door from moving until the time period has elapsed.

Based upon the foregoing, the advantages of the described embodiments are readily apparent. The benefits of the disclosed methodologies utilize a mobile transmitter which periodically generates signals depending upon whether the carrying device is on or not. If the vehicle is determined to be on, then generation of periodic signals by the mobile transmitter are received by the base controller to initiate door movement. The disclosed methodologies eliminate the need for the base controller to generate signals which are received by the mobile transmitter and as such interruption in signals generated by the base controller, which might otherwise interfere with the operation of the system, are avoided. The proposed system is also advantageous in that manual user input is not required and the user has the ability to set sensitivity for when an open command and a close command are generated based upon the position of the carrying device with respect to the access barrier. A variation of the system would allow existing operator systems to be adapted for hands-free use.

As will now be described with reference to FIGS. 15 through 23, another embodiment of the present invention provides a barrier operator system, which may be an add-on to an existing access barrier operating system, and which operates as a "hands free" system to initiate the opening and closing of an access barrier based on the position of a carrying device relative to the access barrier. In addition, the system includes added safety features, such as additional lighting, audible and/or visual indication of when the access barrier is moving, and indications for when the counterbalance spring or springs for the barrier are broken.

Figure 15:
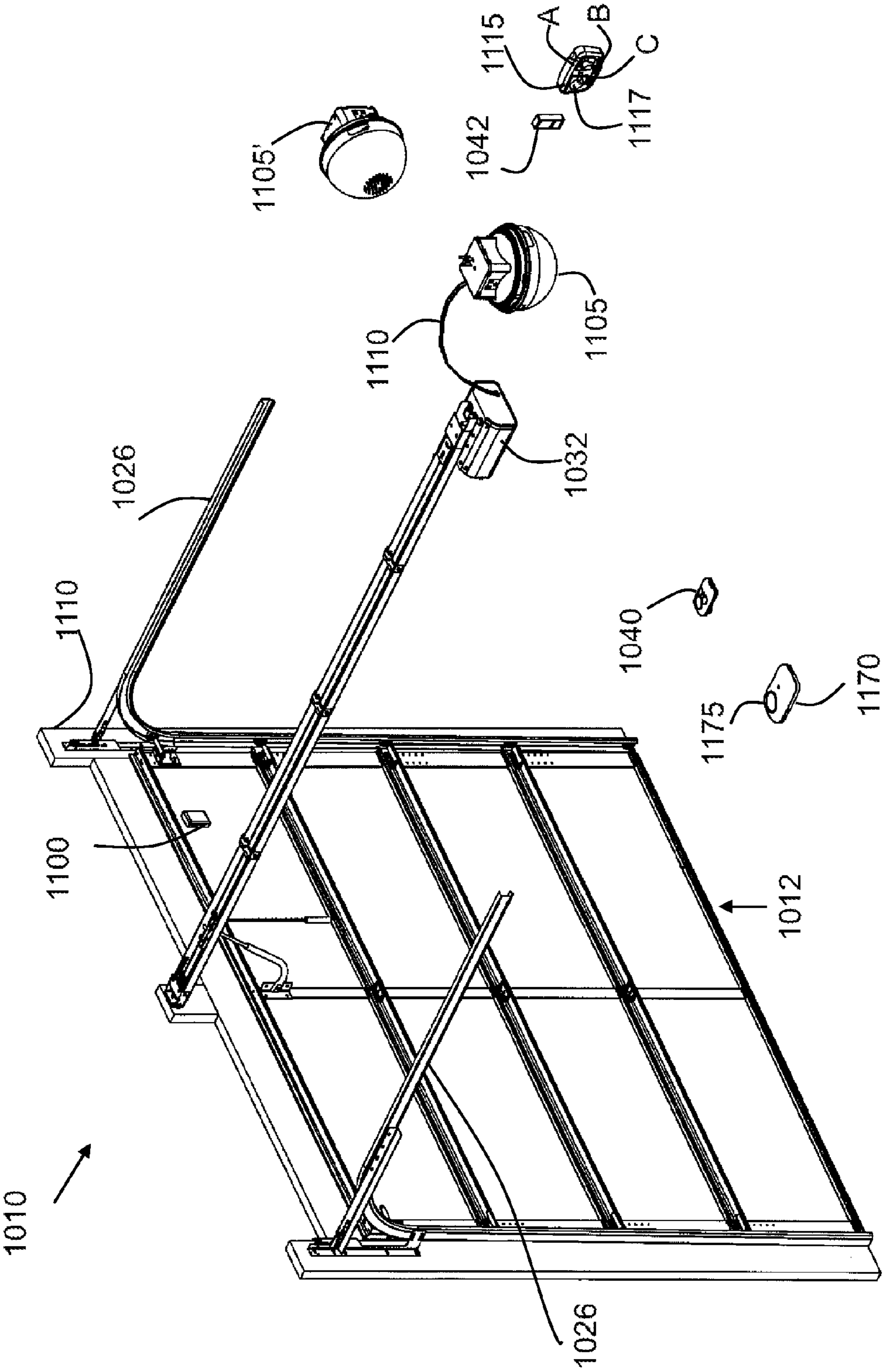
FIG. 15 is a perspective view depicting a barrier system according to another embodiment of the present invention.

Referring to FIG. 15, a barrier operator system 1010 that incorporates the various aspects of the present invention includes a barrier 1012 contained in a track system 1026 attached to a structure 1112, which may be a garage or other type of enclosure, for example. The barrier operator system 1010, which controls motorized opening and closing of the barrier 1012, includes an operator 1032 (normally with integral lighting), an existing wall station 1042 and at least one remote transmitter 1040. The barrier operator system 1010 according to the present invention further includes a barrier state transmitter 1100 (which may also include a receiver, e.g., may be a transceiver, such as a door position/motion sensor transceiver 1100, although additional embodiments are not limited thereto), an add-on controller, e.g., a light kit transceiver controller 1105, a bell wire 1110 that electrically connects the light kit transceiver controller 1105 to the operator 1032, an additional wall station 1115 and a mobile transceiver 1170. The system also includes an add-on indicator, which, as described in greater detail below, provides audible and/or visual indications of a certain conditions of the system, such as when the barrier 1012 is moving, or when one or more counterbalance springs associated with the barrier 1012 are broken, for example. Thus, the barrier operator system 1010 provides an add-on system that provides additional lighting, alerts and/or alarms to indicate a condition of the barrier.

As shown in FIG. 15, an additional, or alternate, light kit transceiver controller 1105' may be included, and may or may not include an additional bell wire (not shown) connected to the operator 1132. Moreover, in an alternative embodiment, the light kit transceiver controller 1105 and/or the additional light kit transceiver controller 1105' may be wirelessly connected to the operator 1132, i.e., the bell wire 1110 may be omitted.

It will be noted that the barrier operator system 1010 is not limited to the components shown in FIG. 15. Instead, the barrier operator system 1010 may include any, or all of, the components described in greater detail above with reference to the embodiments shown in FIGS. 1 through 14. More particularly, the barrier operator system 1010 may include, for example, the base unit/operator 34 including the controller 52 disposed therein (FIG. 2). In addition, the components of the barrier operating system 1010 are retrofitted as an add-on into an existing barrier operating systems, or, alternatively, may be built into a barrier operating system at the factory. Specifically, for example, in the case of the add-on, the barrier operating system 1010 may be included in the light kit 1105, which is in wired and/or wireless communication with the existing access barrier operating system. Alternatively, the barrier operating system 1010 may be included in the additional wall station 1115 or, in another embodiment, portions of the barrier operating system 1010 may be separately included in the in the light kit 1105 and the additional wall station 1115, which are in turn in wired and/or wireless communication with the existing access barrier operating system. In addition, the add-on system may also include visual and audio indicators, as will be described in greater detail below.

Referring still to FIG. 15, the barrier operating system 1010 uses a command sequence, whether sent from a wall station or a remote transceiver, and which includes a "reverse direction-stop-reverse direction-stop," etc. sequence, for example. The logic that incorporates this command sequence into "hands free" operation may either be built into the controller of an existing system, e.g., into the operator 1032, or may be included in the add-on system described above.

As described in greater detail above with reference to FIGS. 1-3, the mobile transceiver 1170, is normally located in a carrying device 108 (best shown in FIGS. 2 and 3), which may be a vehicle, such as an automobile, a motorcycle, a cart, or a bike, for example, although additional embodiments are not limited thereto.

Operations, e.g., logic steps/flow paths thereof, of the barrier operating system 1010 will now be described in greater detail with reference to FIGS. 16-23.

Figure 16:
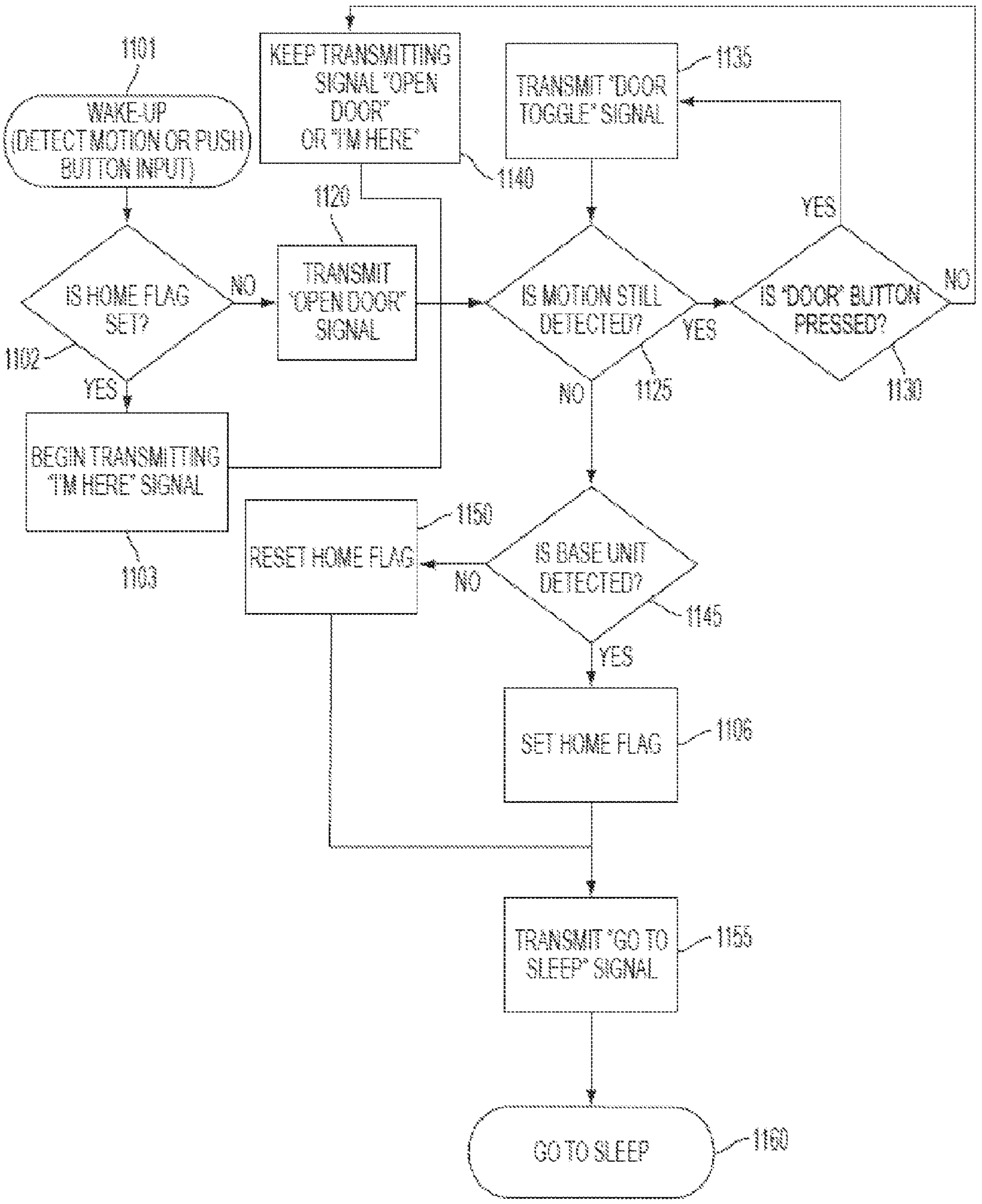
FIG. 16 is an operational flow chart illustrating the operation of a mobile transceiver of the barrier system shown in FIG. 15.

As shown in FIG. 16, the mobile transceiver 1170 is awoken by motion, such as the motion of the vehicle, for example, at step 1101. Alternatively, the mobile transceiver 1170 may be awoken by some other action, such as by detection of electric emissions generated by the vehicle's spark plugs, as described in greater detail above. Additionally, the mobile transceiver 1170 may be awoken by depression of a button 1175 (FIG. 15) on the mobile transceiver 1170. After the mobile transceiver 1170 is awoken, a controller (e.g., one or more of the light kit receiver controller 1105, the additional/alternate kit receiver controller 1105' and the wall station 1115, hereinafter individually or collectively referred to as "the controller" or "the base unit") determines, at step 1102, whether a HOME flag has been set, which indicates that the mobile transceiver 1170 is in the HOME position, e.g., is in the docked state 122 (FIG. 3). When it is determined that the HOME flag is set, the mobile transceiver 1170 transmits an "I'm Here" signal (a first signal) at step 1103. Conversely, when the HOME flag is not set, the mobile transceiver 1170 transmits an "Open Door" command (a first command) at step 1120, and determines, at step 1125, whether motion is still sensed. When the mobile transceiver 1170 still senses the motion, the controller determines at step 1130 whether the transceiver button 1175 on the mobile transceiver 1170 (FIG. 15), which may be labeled "Door," has been pressed. If the transceiver "Door" button 1175 has been pressed, the mobile transceiver 1170 transmits a "Door Toggle" signal (a second signal) at step 1135, and returns to step 1125. Accordingly, the "Door Toggle" signal generated at step 1135 reverses the barrier 1012 on a subsequent move command. If, however, the door button 1175 on the mobile transceiver 1170 has not been pressed, the mobile transceiver 1170 continues to transmit the "Open Door" or the "I'm Here" signal at step 1140. If, at step 1125, there is no motion detected by the mobile transceiver 1170, the mobile transceiver 1170 determines at step 1145 whether the base unit is detected. If the base unit is not detected, the HOME flag is reset at step 1150. If the base unit is detected, the HOME flag is set at step 1106, and a command is sent from the controller/base unit to the mobile transceiver 1170 to "go to sleep" at step 1155 and, accordingly, the mobile transceiver 1170 goes to sleep at step 1160.

Figure 17:
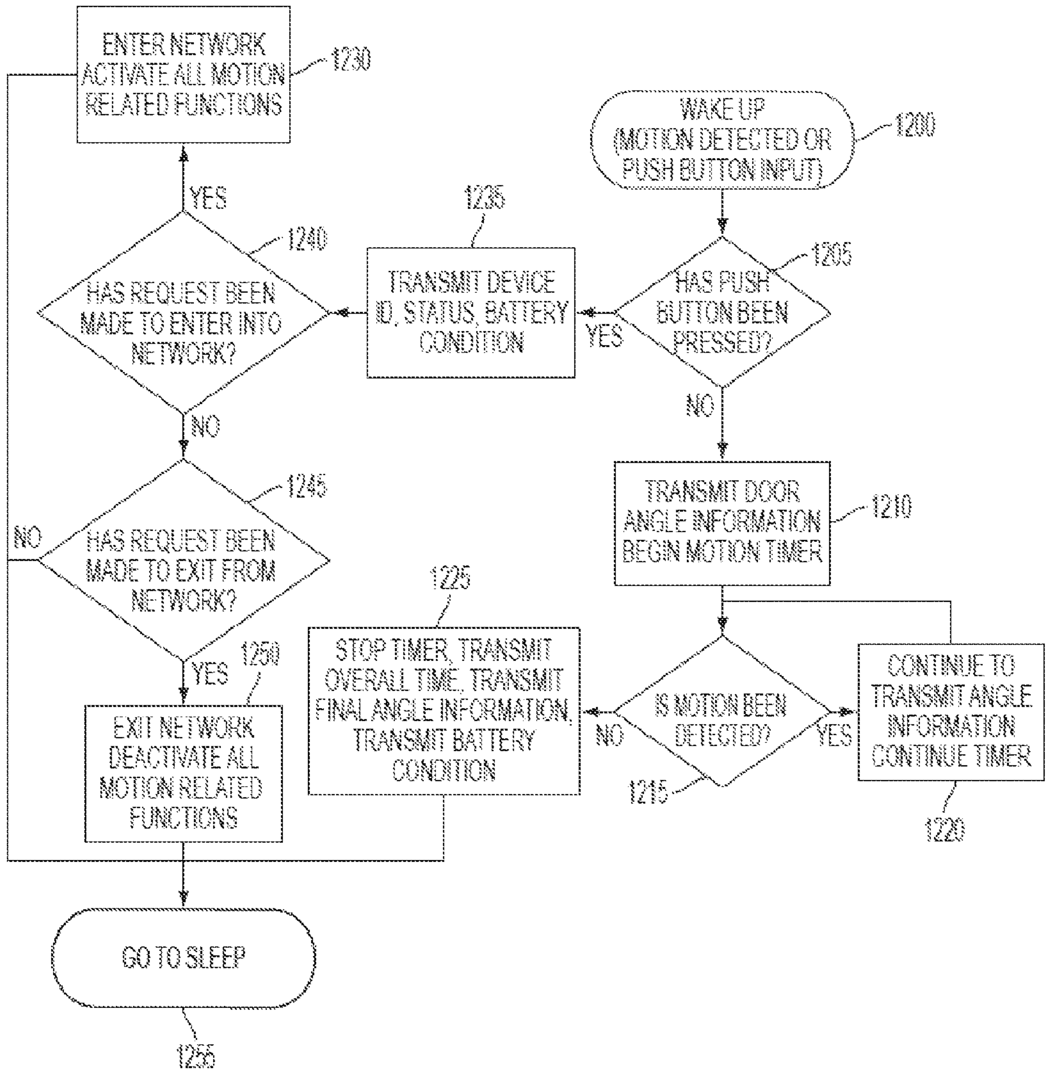
FIG. 17 is a flow chart illustrating the logic of a door position/motion transceiver of the barrier system shown in FIG. 15.

Referring now to FIG. 17, the door position/motion sensor transceiver 1100 is awoken at step 1200 by either sensing motion, or by the depression of a button 1117 on the wall station 1115. At step 1205, a determination is made whether the button 1117 was depressed. If the button 1117 was not depressed, at step 1205 the controller transmits door angle information and starts the motion timer (step 1210) and attempts to detect door motion at step 1215. If door motion is detected, the controller continues to transmit door angle information and the timer continues at step 1120. If door motion is not detected at step 1215, the timer is stopped and the overall time count, along with final angle information and battery condition, is transmitted (step 1125) and is entered into a network at step 1230. If it is determined at step 1205 that the button 1117 on the wall station 1115 has been depressed, the wall station 1115 (FIG. 15) transmits the device identification, status, and battery condition at step 1235. At step 1240, a determination is made as to whether a request has been made to enter into a network. If a request has been made has been made to enter into a network, the network is entered and all motion related functions are activated at step 1230. If it is determined that a request was not made to enter into a network at step 1240, a determination is made at step 1245 as to whether a request has been made to exit from a network. If a request to exit a network was not entered, the path continues on to step 1230. If a request was made to exit a network at step 1245, the exit occurs at step 1250, all motion related functions are deactivated, and the motion transmitter 1100 goes to sleep at step 1255.

Figure 18A:
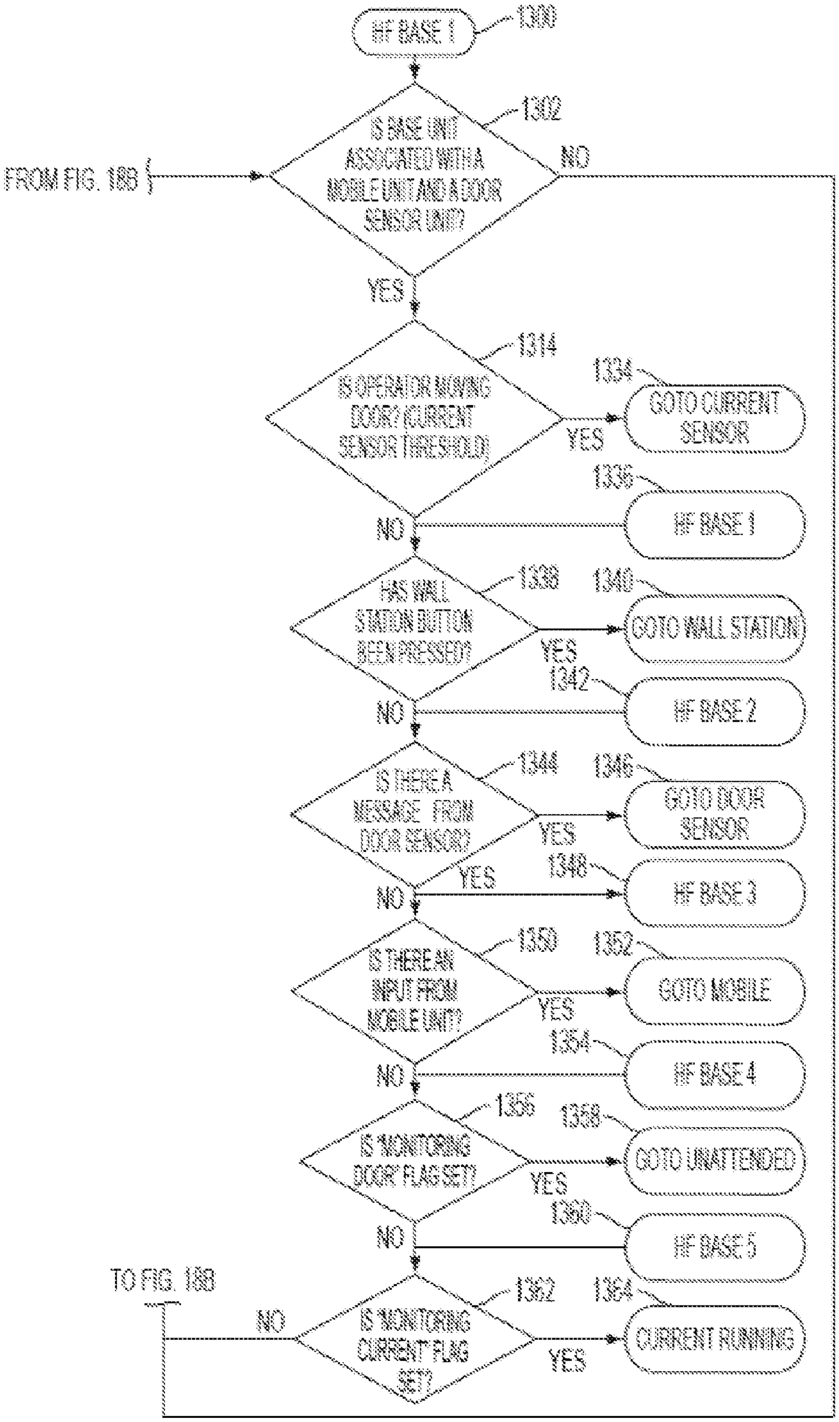
FIGS. 18A and 18B illustrate a flow chart of a base receiver and a controller of the barrier system shown in FIG. 15.
Figure 18B:
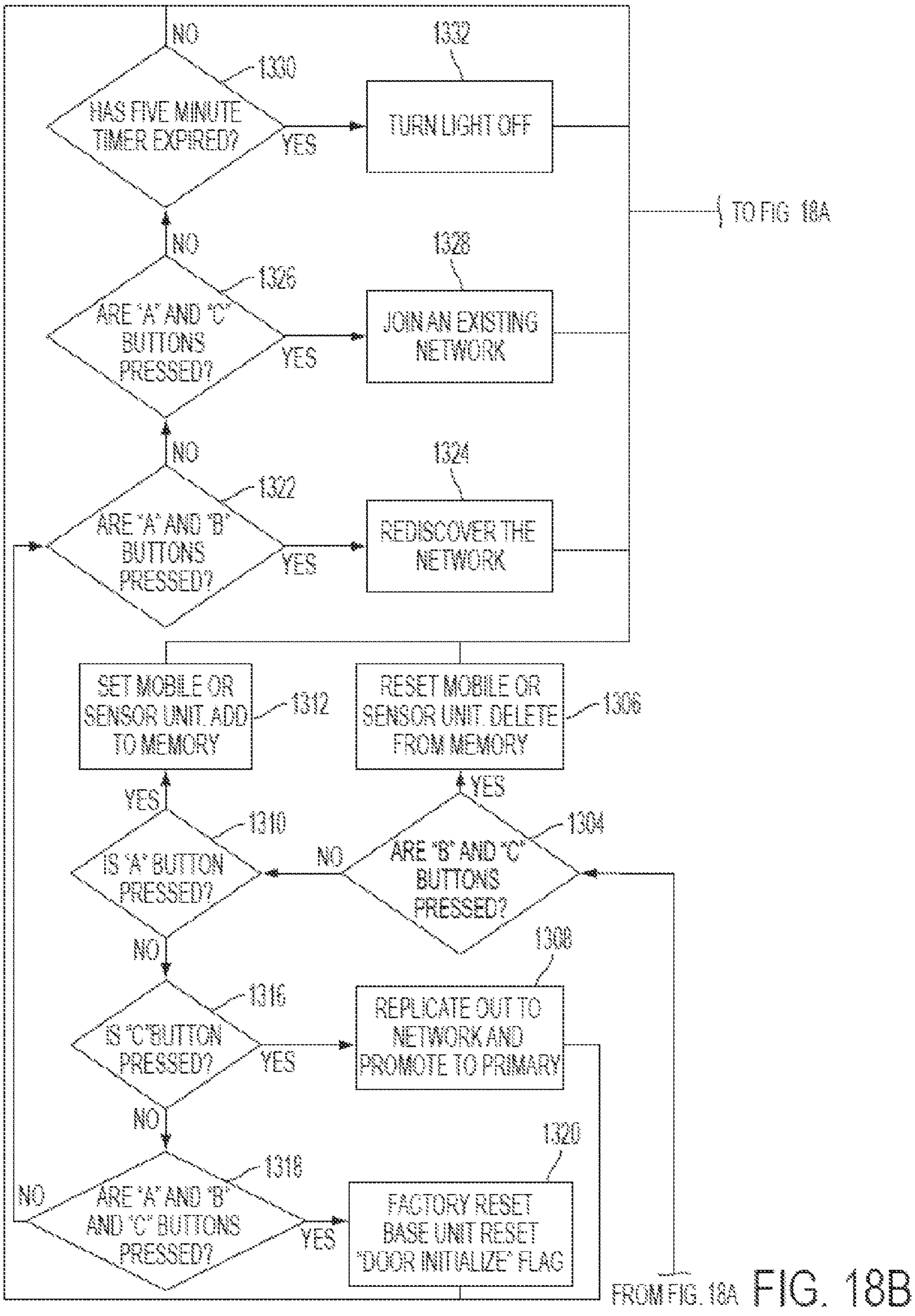

As shown in FIG. 18, the controller logic begins at step 1300 ("Hands free (HF) Base 1"), and a determination is made in step 1302 as to whether the controller/base unit is associated with one or more mobile transceivers 1170 and/or with a position/motion sensor 1100 (FIG. 15). If there is no association, it is determined in step 1304 whether "B" and "C" buttons on the wall station 1115 are pressed. If the "B" and "C" buttons are pressed, mobile or sensor transceiver identifications are deleted and reset (step 1306), the mobile or sensor transceiver identifications are replicated out to the network and promoted to primary (step 1308), and operation returns to step 1302. If the "B" and "C" buttons are not pressed at step 1304, the base unit determines at step 1310 whether an "A" button on the wall station 1115 was pressed. If the "A" button was pressed, the flow continues to step 1312, where the identification of the mobile transceiver 1170 (FIG. 15) and/or the motion/position sensor 1100 is set and added to a memory 54 (FIG. 2) and the operation continues to step 1314 (via step 1302). If it is determined at step 1310 that the "A" button was not pressed, but the "C" button was instead pressed (step 1316), the operation continues to step 1308, described above. If at step 1316 it is determined that the "C" button was not pressed, the flow goes to step 1318 to determine whether the "A", "B," and "C" buttons were pressed, in which case the process goes to step 1320 to perform a factory reset of the base unit and a reset of a "Door Initialize" flag. In contrast, if it is determined at step 1318 that the "A", "B," and "C" buttons were not pressed, the process continues to step to determine whether the "A" and "B" buttons were pressed; if they were, the process goes to step 1324, where the network is rediscovered and the process continues to step 1302. If at step 1322 it is determined that buttons "A" and "B" were not pressed, the process goes to step 1326 to determine whether the "A" and "C" buttons were pressed. If the "A" and "C" buttons were pressed, an existing network is joined at step 1328 and the process continues on to step 1302. If at step 1326 it is determined that the "A" and "C" buttons were not pressed, the process continues to step 1330 where it is determined whether a five minute timer has expired. If the five minute timer has expired, a light or lights (not shown) in at least one of the light kit receivers 1105 and/or 1105' is turned off (step 1332) and the process goes again to step 1302. Thus, as described above, a routine of pressing one or more specific buttons is utilized to program various functions such as, but being limited to, accessing a network.

Figure 20:
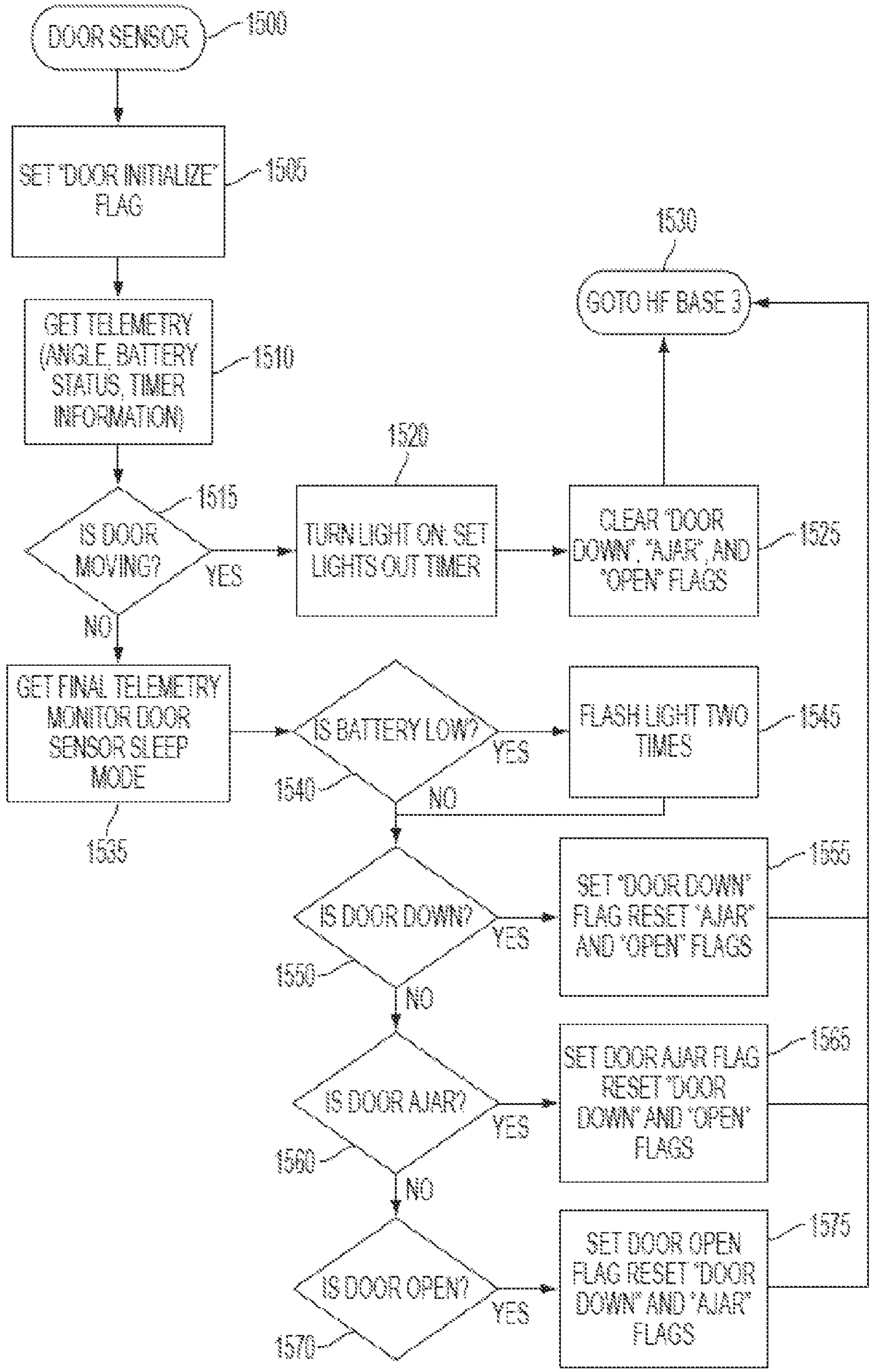
FIG. 20 is a flow chart illustrating a door position/motion sensor of the barrier system shown in FIG. 15.
Figure 21:
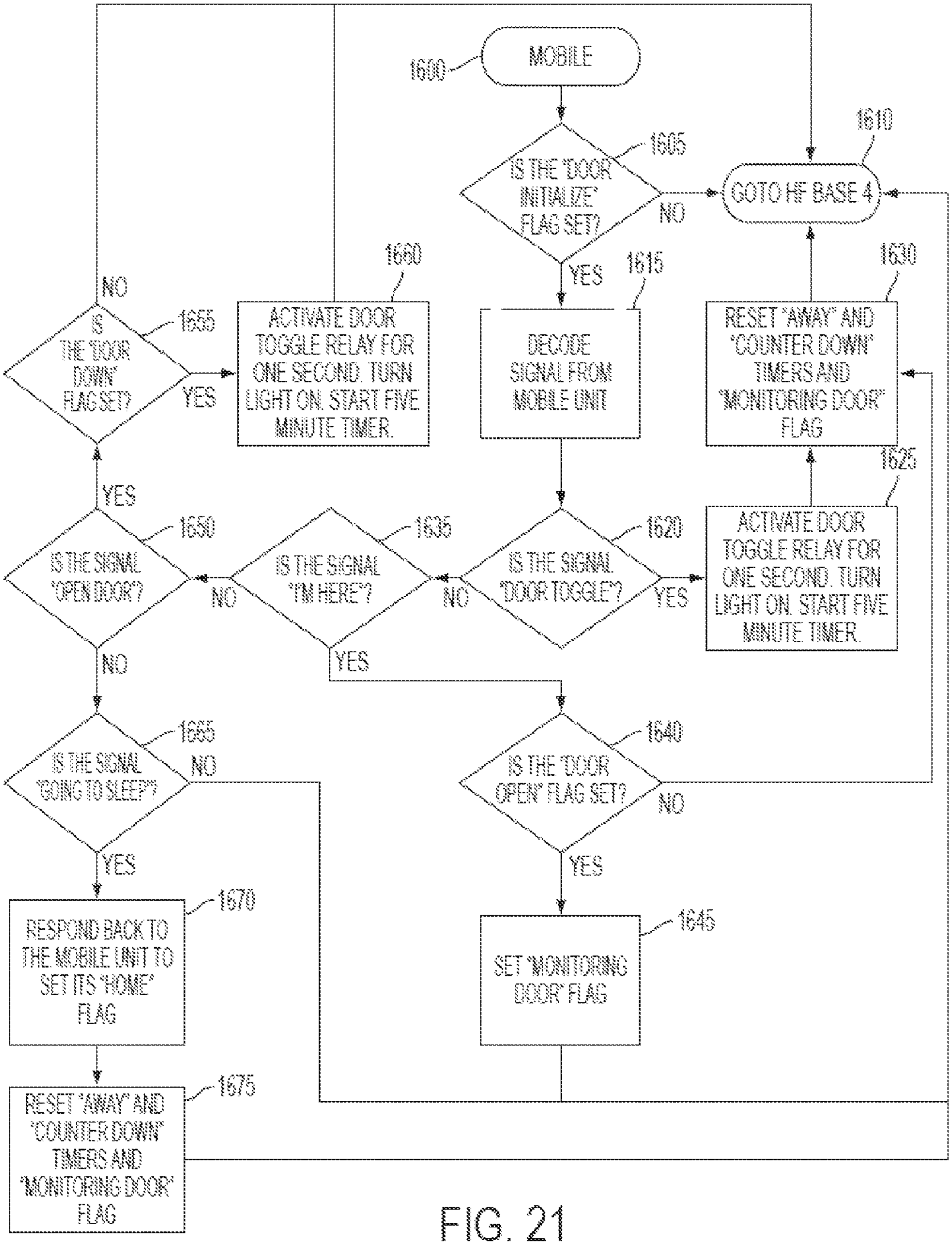
FIG. 21 is an operational flow chart illustrating the operation of the base receiver and the controller of the barrier system shown in FIG. 15.
Figure 22:
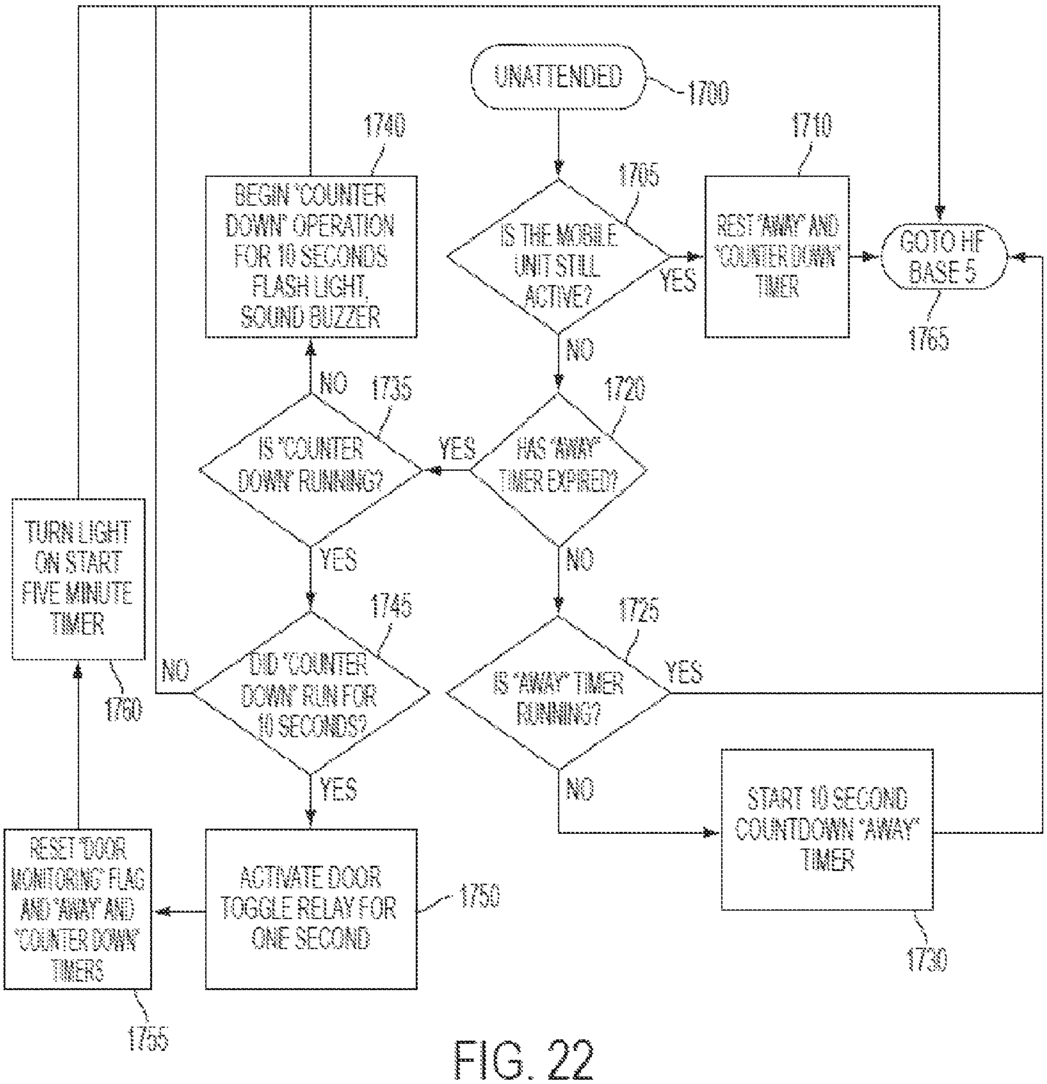
FIGS. 22 and 23 are operational flow charts illustrating unattended operations of the barrier system shown in FIG. 15.
Figure 23:
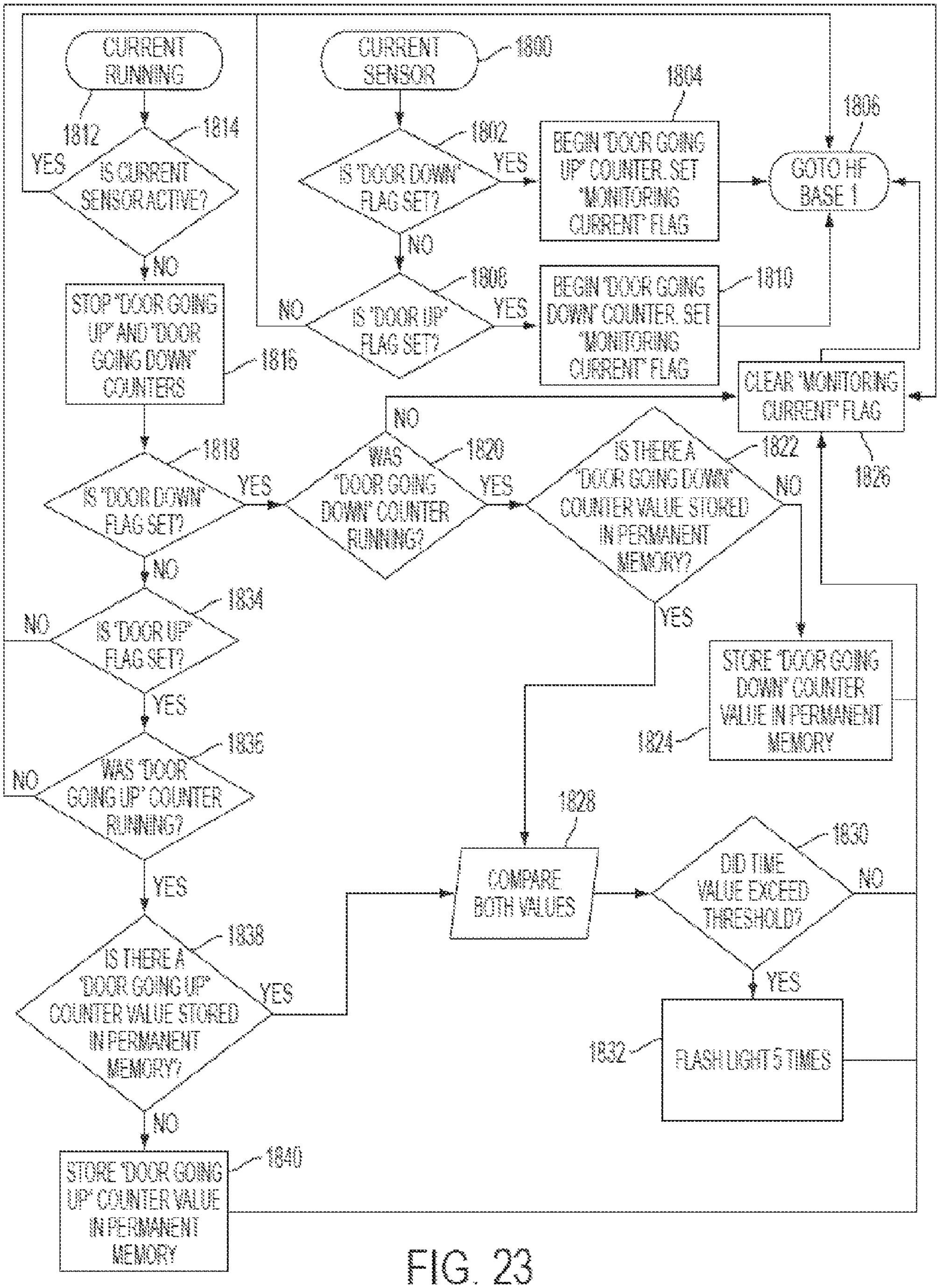

Still referring to FIG. 18, and step 1302 in particular, if it is determined that the base unit is associated with one or more mobile transceivers 1170 and a door position/motion sensor 1100, the process moves to step 1314 to determine whether the door 1012 (FIG. 15) is moving. Specifically, the door position/motion sensor 1100 determines whether the door 1012 is moving by using a current sensing device (not shown), for example, although other embodiments are not limited thereto. If it is determined in step 1314 that the door 1012 is moving, the process goes to the current sensor (FIG. 23) at step 1334. If the door 1012 is not moving, at step 1336 the process goes to HF base 1 (step 1300) and to step 1338 to determine whether the button 1117 on the wall station 1115 has been pressed. If the button 1117 on the wall station 1115 has been pressed, the process goes to the wall station (FIG. 19) at step 1340. If the button 1117 on the wall station 1115 has not been pressed, the process goes to HF base 2 (FIG. 20) at step 1342 and to step 1344 to determine whether there is a message from the door position/motion sensor 1100. If at step 1344 there is a message from the door position/motion sensor 1100, at step 1346 the process goes to the door sensor step (FIG. 20). If there is no message from the door sensor 1100 at step 1344, the process continues to HF base 3 (FIG. 21) at step 1348 and to step 1350, where a determination is made as to whether there is an input from the mobile transceiver 1170. If there is input from the mobile transceiver 1170, at step 1352 the process goes to the mobile step (FIG. 21). If there is no input from the mobile transceiver 1170 at step 1350, the process goes to HF base 4 (FIG. 22) at step 1354 and a determination is made at step 1356 as to whether an unattended "Monitoring Door" flag has been set. If the unattended "Monitoring Door" flag has been set, at step 1358, the process goes to "unattended" operation (FIG. 22). If the unattended "Monitoring Door" flag has not been set, the process goes to HF base 5 at step 1360, and at step 1362 it is determined whether a "Monitoring Current" flag has been set. If it is determined at step 1362 that the "Monitoring Current" flag has been set, the process continues at step 1364 to the monitoring current running step (FIG. 23). If the "Monitoring Current" flag has not been set, the process continues to back to steps 1300 (HF base 1) and 1304 (determining whether "B" and "C" buttons are pressed), which were both described in greater detail above.

Figure 19:
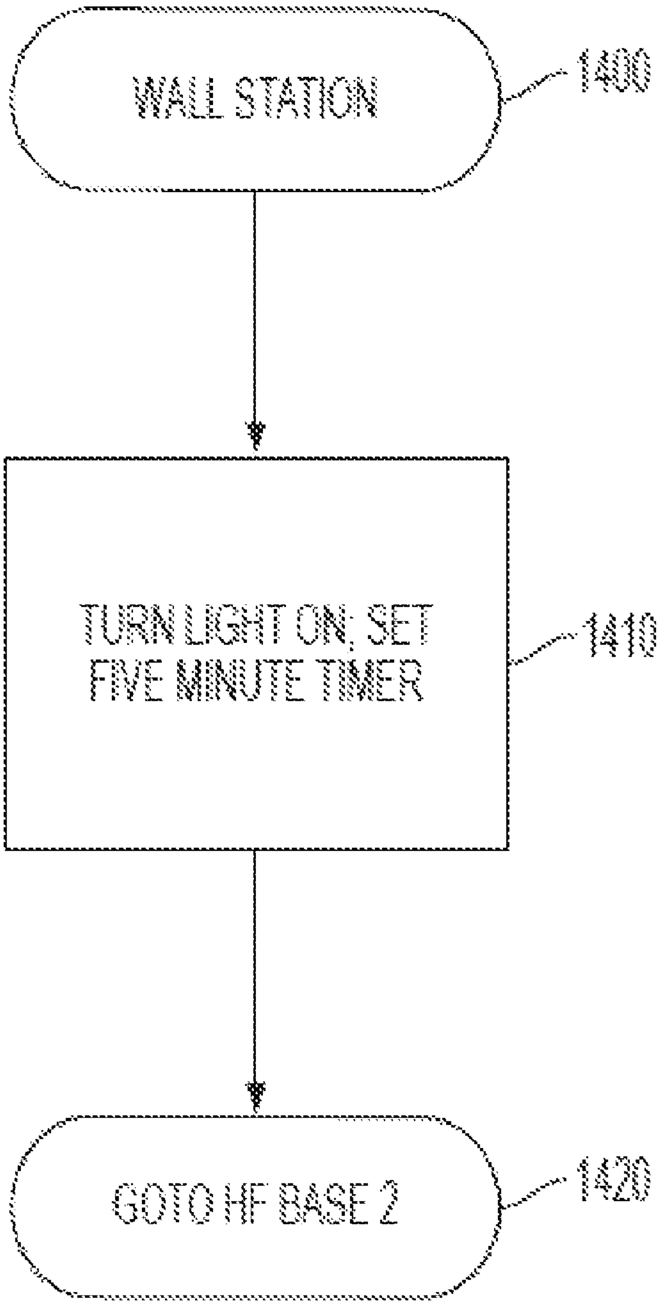
FIG. 19 is a flow chart of a wall station of the barrier system shown in FIG. 15.

The flow of the logic for the wall station 1115 (FIG. 15) is shown in FIG. 19. As can be seen in FIG. 19, when the button 1117 on the wall station 1115 is depressed, an operating command is sent from the wall station 1115 to the base station (step 1400.) When the base station receives the command, it turns on the light (not shown) and start the lights out timer (step 1410) and, at step 1420, the process proceeds to HF base 2 (FIG. 20).

FIG. 20, which depicts the HF base 2 logic, is an operational flow chart for the door position/motion sensor 1100 shown in FIG. 15. In one embodiment, the door sensor 1100 uses a tilt switch (not shown), but it will be noted that other embodiments of the door sensor 1100 are not limited to a tilt switch. As shown in FIG. 20, the door sensor logic for the door sensor 1100 starts at step 1500, and a "Door Initialize" flag is set at step 1505. In step 1510, the door sensor 1100 obtains door angle, battery status, and timer information. A determination is made at step 1515 as to whether the door 1012 is moving. If it is determined at step 1515 that the door 1012 is moving, the light(s) (not shown) in the light kit 1105 and/or in the additional/alternative light kit 1105' are turned on, and the lights out timer is set (step 1520). The process continues, and the "Door Down," "Door Ajar," and "Door Open" flags are cleared at step 1525, after which the process proceeds to HF base 3 (FIG. 21) at step 1530. If it is determined that the door 1012 is not moving (step 1515), the door sensor 1100 obtains final angle, battery status, and timer information, and monitors for the door sensor sleep mode at step 1535.

At step 1540, the door sensor 1100 determines whether the battery voltage is low. If the battery voltage is low, the door sensor 1100 flashes the light(s) two times (step 1545) and continues to step 1550. In contrast, when the battery voltage is acceptable, e.g., when the battery voltage is not low or otherwise abnormal, the process continues from step 1540 to step 1550, where it is determined whether the door 1012 is in the closed position. If the door 1012 is determined to be in the closed position, the process moves to step 1555, where the "Door Down" flag is set, and the "Door Ajar" and "Door Open" flags are reset, and continues to step 1530. If the door 1012 is not in the closed position, the process moves to step 1560 to determine whether the door 1012 is ajar or partially opened. If the door 1012 is ajar or partially opened, the process moves to step 1565 where the "Door Ajar" flag is set and the "Door Down" and "Door Open" flags are reset, and then continues to step 1530. If the door 1012 is determined to not be ajar or partially open at step 1560, the process continues to step 1570 to determine if the door 1012 is open. If the door 1012 is open, the process continues to step 1575, where the "Door Open" flag is set and the "Door Ajar" and "Door Down" flags are reset, and the operation continues to step 1530. Thus, the steps described above allow for leaving the door 1012 partially open, such as for ventilation or egress of pets, for example, and still maintains for hands free operation of the door.

As shown in FIG. 21, operation of the mobile transceiver 1170 (FIG. 15) starts in step 1600, and a determination is made in step 1605 to determine whether the "Door Initialize" flag has been set, as described above with reference to FIG. 18. If the "Door Initialize" flag has not been set, at step 1610, the process goes to HF base 4 (FIG. 22). If the "Door Initialize" flag has been set, the process decodes a signal from the mobile transceiver 1170 (step 1615) and goes to step 1620 to determine whether the received signal is a "Door Toggle" signal. If the received signal is a "Door Toggle" signal, the process goes to step 1625, where the door toggle relay (not shown) is temporarily energized, e.g., is energized for about one second, but not being limited thereto. In addition, the lights (not shown) in the light kits 1105 and/or 1105' are energized, and the light out timer is set, and the process proceeds to step 1630, where the "Away" and "Counter Down" timers are reset, and the "Monitoring Door" flag is set. The process then goes to HF base 4 (FIG. 22) at step 1610. If the received signal was not a "Door Toggle" signal, a determination is made at step 1635 as to whether the signal is the "I'm Here" signal. If the signal is the "I'm Here" signal, the process goes to step 1640, where it is determined whether the "Door Open" flag is set. If the "Door Open" flag is set, the process goes to step 1645, where the "Monitoring Door" flag is set and the process returns to HF base 4 (FIG. 22) at step 1610. If it is determined at step 1640 that the "Door Open" flag is not, set the process goes to step 1630, and then to HF base 4 (step 1610). If it is determined in step 1635 that the signal is not an "I'm Here" signal, the process goes to step 1650 where a determination is made as to whether the signal is an "Open Door" signal. If the signal is an "Open Door" signal, the process moves to step 1655, where it is determined whether the "Door Down" flag is set. If the "Door Down" flag is not set, the process continues to HF base 4 at step 1610. If the "Door Down" flag is set, the process continues to step 1660, where the door toggle relay is temporarily activated, such as for about one second, the light(s) and lights out timer are activated, and the process proceeds to HF base 4 (FIG. 22) at step 1610. If the signal is determined to not be an "Open Door" signal, the process moves to step 1665 to determine whether the signal is a "Going to Sleep" signal. If the signal is not a "Going to Sleep" signal, the process continues to HF base 4 at step 1610. If the signal is a "Going to Sleep" signal, the process continues to step 1670, and the base unit responds back to the mobile transceiver 1170 to set the HOME flag and, at step 1675, to reset the AWAY and COUNTER DOWN timers and set the "Monitoring Door" flag. The process then returns to HF base 4 (FIG. 22) at step 1610.

FIG. 22 shows the logic for unattended operation of barrier 1012 using the hands free barrier operator system 1010 shown in FIG. 15. Generally speaking, and as will be described in greater detail below, the logic provides closing of the barrier or door 1012 within a predetermined period of time after the mobile transceiver 1170 has left an area controlled by the operator, see, e.g., FIG. 3 and the accompanying description above. Moreover, audible and/or visual indications are generated when the barrier or door 1012 is moving and, more particularly, when the barrier or door is moving in the closing direction, e.g., downward. The unattended operation logic starts at step 1700 and continues to step 1705, where a determination is made as to whether the mobile transceiver 1170 (FIG. 15) is active. If at step 1705 it is determined that the mobile transceiver 1170 is active, the process goes to step 1710, where the AWAY and COUNTER DOWN timers are reset, and then goes to HF base 5 (FIG. 23) at step 1765. If it is determined at step 1705 that the mobile transceiver 1170 is not active, the process goes to step 1720, where it is determined whether the AWAY timer has expired. If the AWAY timer has not expired, the process goes to step 1725 to determine whether the AWAY timer is running If the AWAY timer is running, the process goes to HF base 5 (FIG. 23) at step 1765. If the AWAY timer is not running, the process moves to step 1730, where a 10 second countdown AWAY timeout is started, and then to HF base 5 (FIG. 23) at step 129. If it is determined at step 1720 that the AWAY timer has expired, the process goes to step 1735 to determine whether the COUNTER DOWN timer is running. If the COUNTER DOWN timer is not running, the process goes to step 1740 and the COUNTER DOWN timer operates for 10 seconds, a visual light or lights (not shown) in the light kit 1105 and/or 1105' blinks, and an audible sound is emitted from the light kit 1105 and/or 1105', and the process returns to HF base 5 (FIG. 23) at step 1765. If the COUNTER DOWN timer is running, at step 1745 it is determined whether the COUNTER DOWN timer ran for 10 seconds. If the COUNTER DOWN timer did not run for 10 seconds, the process returns to HF base 5 (FIG. 23) at step 1765. If the COUNTER DOWN timer ran for 10 seconds, the process goes to step 1750, where the door toggle relay is activated, for about one second, for example. In step 1755, the "door monitoring" flag and the AWAY and the COUNTER DOWN timers are reset. The process then moves to step 1760, where the light is turned on and the light out timer is started, and the process returns to HF base 5 (FIG. 23) at step 1765.

FIG. 23 illustrates the HF base 5 logic for current running and current sensing operation that indicates, for example, when one or more of the counterbalance springs (not shown) in the counterbalance system 30 (FIG. 1) are broken, or when another imbalance conditions exist. More particularly, the controller determines whether the counterbalance spring(s) are broken by analyzing time-to-distance relationships for travel of the barrier from an open position to a closed position, and/or travel of the barrier from the closed position to the open position, as will now be described in further detail.

As shown in FIG. 23, the logic starts with at current sensor (step 1800). At step 1802, a determination is made whether the "Door Down" flag has been set. If the "Door Down" flag has been set, the process moves to step 1804, where a timing count of the door going up begins and the "Monitoring Current" flag is set. The process then goes to HF base 1 (FIG. 18) at step 1806. If, on the other hand, the "Door Down" flag has not been set, the process moves to step 1808, where it is determined whether the "Door Up" flag has been set. If the "Door Up" flag has been set, the process goes to step 1810, and the "door going down" counter begins counting and the "Monitoring Current" flag is set. Operation then proceeds to HF base 1 (FIG. 18) at step 1806.

Still referring to FIG. 23, the current running logic starts at step 1812 and a determination is made at step 1814 as to whether the current sensor (not shown) is active. If the current sensor is active, the process goes to HF base 1 (FIG. 18) at step 1806. If, on the other hand, the current sensor is not active, the process goes to step 1816, where the "Door Going Up" and the "Door Going Down" counters are stopped, and the process proceeds to step 1818 to determine whether the "Door Down" flag has been set. If, at step 1818, it is determined that the "Door Down" flag is set, the process goes to step 1820, where it is determined whether the "Door Going Down" counter was running. At step 1822, a determination is made as to whether a "Door Going Down" counter value is stored in memory, e.g., the memory 54 or 74 shown in FIG. 2, which may be a permanent, i.e., non-volatile, memory. If a "Door Going Down" counter value was not stored in the permanent memory, the current "Door Going Down" counter value is stored in the permanent memory (step 1824) and the operation continues on to step 1826, where the "Monitoring Current" flag is cleared. If, at step 1822, it is determined that a "Door Going Down" counter value is stored in the permanent memory, the current "Door Going Down" counter value is compared to the value stored in the permanent memory (step 1828). At step 1830, a determination is made as to whether the time value exceeded a predetermined threshold. If the time value did not exceed the threshold, the process goes to step 1826, where the "Monitoring Current" flag is cleared. If, however, the time value exceeded the threshold, the process goes to step 1832, and the light (not shown) in the light kits 1105 and/or 1105' flashes, such as 5 times, for example, and the process continues to step 1826, where the "Monitoring Current" flag is cleared.

If it is determined (at step 1818) that the "Door Down" flag is not set, the process goes to step 1834 to determine whether the "Door Up" flag is set. If the "Door Up" flag was not set, the process goes to step 1826, where the "Monitoring Current" flag is cleared. If, on the other hand, the "Door Up" flag was set, the process goes to step 1836 to determine whether the "Door Going Up" counter was running. If the "Door Going Up" counter was not running, the process goes to step 1826, where the "Monitoring Current" flag is cleared. On the other hand, if the "Door Going Up" counter was running, the process moves to step 1838, where it is determined whether a "Door Going Up" counter value is stored in the permanent memory. If there is a "Door Going Up" counter value stored in the permanent memory, the process continues to step 1828 for a comparison of the two values. If there is no "Door Going Up" counter value stored in the permanent memory, the current "Door Going Up" counter value is stored in the permanent memory at step 1840, and the process then goes to step 1826, where the "Monitoring Current" flag is cleared.

Accordingly, in one or more embodiments described herein, the counter values of both the "Door Going Up" and the "Door Going Down" are compared to determine an imbalance indication, which indicates that the counterbalance spring or springs have failed, or that some other unsafe condition may be present. When such a condition is determined to exist, the user is warned, such as by the audible and/or visual indications described above.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A discrete add-on control system for a barrier operating system, comprising:

a mobile transmitter, having a button, to automatically and periodically generate a mobile signal, to transmit one of a first signal and a first command based on whether a home flag has been set, and to transmit a second signal based on whether a button has been pressed;

a barrier state transmitter to generate a barrier state signal;

a controller, connected to the barrier operating system, to receive the mobile signal and the barrier state signal, and to command the barrier operating system to move a barrier based upon the mobile signal and the barrier state signal; and an indicator to indicate a condition of the barrier.

2. The system of claim 1, wherein the indicator comprises one of an audible and a visual indication of the state of the barrier.

3. The system of claim 2, wherein the audible indication comprises a sound emitting diode.

4. The system of claim 2, wherein the visual indication comprises a flashing light.

5. The system of claim 1, wherein said condition of the barrier comprises one of movement of the barrier and whether a counterbalance spring associated with the barrier is broken.

6. The system of claim 1, further comprising a bell wire to connect the controller to the barrier operating system.

7. The system of claim 1, wherein the controller is wirelessly connected to the barrier operating system.

8. The system of claim 1, wherein the barrier transmitter comprises a tilt switch.

9. A method of operating a discrete add-on control system for a barrier operating system, the method comprising:

awakening a mobile transmitter;

determining whether a home flag has been set and transmitting one of a first signal and a first command based thereon;

determining whether a button on the mobile transmitter has been pressed and transmitting a second signal based thereon;

determining whether a base unit has been detected;

receiving a mobile signal automatically and periodically transmitted from the mobile transmitter;

receiving a barrier state signal from a barrier state transmitter;

determining whether to move a barrier based on the mobile signal and the barrier state signal, and, if so determined, sending an operating signal to the barrier operating system to move the barrier;

determining a condition of the barrier; and indicating the condition of the barrier.

10. The method of claim 9, wherein said indicating the condition of the barrier comprises one of an audible and a visual indication of the state of the barrier.

11. The system of claim 10, wherein the audible indication comprises emitting sound from a sound emitting diode.

12. The system of claim 10, wherein the visual indication comprises flashing a light.

13. The method of claim 9, wherein said determining the condition of the barrier comprises at least one of determining a position of the barrier, sensing motion of the barrier and determining whether a counterbalance spring associated with the barrier is broken.

14. The method of claim 13, wherein the sensing the motion of the barrier comprises sensing motion of the barrier from an open to a closed position.

15. The method of claim 13, wherein said determining whether the counterbalance spring is broken comprises analyzing time-to-distance relationships between travel of the barrier from open to closed positions and travel of the barrier from the closed to open positions.

16. The method of claim 9, wherein the awakening the mobile transmitter comprises sensing one of motion of a carrying device and pressing of a button.

17. The method of claim 16, further comprising:

determining whether the motion of the carrying device is still sensed; and transmitting a go to sleep command to the mobile transmitter when it is determined that the motion is not still sensed and that the base unit has been detected.

18. The method of claim 16, further comprising:

sensing whether one or more of a plurality of buttons on a wall station connected to the barrier operating system have been pressed; and configuring the discrete add-on control system based on the sensing the whether one or more of the plurality of buttons have been pressed.

19. The method of claim 18, wherein the configuring the discrete add-on control system comprises at least one of resetting a transmitter identification, deleting the transmitter identification, identifying the mobile transmitter; identifying the barrier transmitter, factory resetting the discrete add-on control system, identifying a network, joining the network, turning on a light in the discrete add-on control system and turning off the light in the discrete add-on control system.

* * * * *